(12) United States Patent
Sayed et al.

(10) Patent No.: US 12,737,906 B2
(45) Date of Patent: Sep. 15, 2026

(54) 3D RECONSTRUCTION WITHOUT 3D CONVOLUTIONS

(71) Applicant: Niantic Spatial, Inc., San Francisco, CA (US)

(72) Inventors: Mohamed Sayed, London (GB); John Gibson, Sunnyvale, CA (US); James Watson, London (GB); Victor Adrian Prisacariu, Oxford (GB); Michael David Firman, London (GB); Clément Godard, San Francisco, CA (US)

(73) Assignee: Niantic Spatial, Inc., San Francisco, CA (US)

( * ) Notice: Subject to any disclaimer, the term of this patent is extended or adjusted under 35 U.S.C. 154(b) by 468 days.

(21) Appl. No.: 18/144,099

(22) Filed: May 5, 2023

(65) Prior Publication Data

US 2023/0360241 A1 Nov. 9, 2023

Related U.S. Application Data

(60) Provisional application No. 63/339,090, filed on May 6, 2022.

(51) Int. Cl.

*G06T 7/55* (2017.01)
*G06T 15/08* (2011.01)
*G06T 17/00* (2006.01)

(52) U.S. Cl.

CPC ................ *G06T 7/55* (2017.01); *G06T 15/08* (2013.01); *G06T 17/00* (2013.01); *G06T 2207/20221* (2013.01)

(58) Field of Classification Search

CPC ........... G06T 7/55; G06T 15/08; G06T 17/00; G06T 2207/20221; G06T 2207/20081; G06T 2207/20084; A63F 13/655

See application file for complete search history.

(56) References Cited

U.S. PATENT DOCUMENTS 10,546,424 B2 * 1/2020 Pang .................... H04N 13/156
10,600,233 B2 * 3/2020 Lakshman ............. G09G 3/005
(Continued)

OTHER PUBLICATIONS

Sun, Penghui, Suping Wu, and Kui Lin. "Attention-guided multi-view stereo network for depth estimation." 2020 IEEE 22nd International Conference on High Performance Computing and Communications; IEEE 18th International Conference on Smart City; (Year: 2020).*

(Continued)

*Primary Examiner* — Ross Varndell
*Assistant Examiner* — Rachel L Roberts
(74) *Attorney, Agent, or Firm* — Fenwick & West LLP

(57) ABSTRACT

A depth estimation module may receive a reference image and a set of source images of an environment. The depth module may receive image features of the reference image and the set of source images. The depth module may generate a 4D feature volume that includes the image features and metadata associated with the reference image and set of source images. The image features and the metadata may be arranged in the feature volume based on relative pose distances between the reference image and the set of source images. The depth module may reduce the 4D feature volume to generate a 3D cost volume. The depth module may apply a depth estimation model to the 3D cost volume and data based on the reference image to generate a two dimensional (2D) depth map for the reference image.

18 Claims, 12 Drawing Sheets

(56) References Cited

U.S. PATENT DOCUMENTS

| | | | | |
|---|---|---|---|---|
| 11,062,471 | B1 * | 7/2021 | Zhong | G06T 7/593 |
| 2016/0148433 | A1 * | 5/2016 | Petrovskaya | G02B 27/01 345/633 |

OTHER PUBLICATIONS

Bhat, S.F. et al., "AdaBins: Depth Estimation Using Adaptive Bins," Proceedings of the IEEE/CVF Conference on Computer Vision and Pattern Recognition, Nov. 28, 2020, pp. 4009-4018.

Bozic, A. et al., "Transformerfusion: Monocular rgb scene reconstruction using transformers," Advances in Neural Information Processing Systems, 34, Dec. 6, 2021, pp. 1403-1414.

Casser, V. et al., "Depth prediction without the sensors: Leveraging structure for unsupervised learning from monocular videos," Proceedings of the AAAI conference on artificial intelligence, vol. 33. No. 01. Jul. 17, 2019, pp. 8001-8008.

Chang, J.R. et al., "Pyramid stereo matching network," Proceedings of the IEEE conference on computer vision and pattern recognition, Jun. 2018, pp. 5410-5418.

Chen, Y. et al., "Self-supervised learning with geometric constraints in monocular video: Connecting flow, depth, and camera," Proceedings of the IEEE/CVF International Conference on Computer Vision, Jul. 12, 2019, pp. 7063-7072.

Cheng, X. et al., "Learning depth with convolutional spatial propagation network," IEEE transactions on pattern analysis and machine intelligence, 42(10) arXiv:1810.02695v3, Oct. 4, 2019, pp. 2361-2379.

Choe, J. et al., "Volumefusion: Deep depth fusion for 3d scene reconstruction," Proceedings of the IEEE/CVF International Conference on Computer Vision, Aug. 19, 2021, pp. 16086-16095.

Collins, R.T., "A space-sweep approach to true multi-image matching," Proceedings CVPR IEEE computer society conference on computer vision and pattern recognition, Dec. 1995 pp. 358-363.

Curless, B. et al., "A volumetric method for building complex models from range images," Proceedings of the 23rd annual conference on Computer graphics and interactive techniques, Aug. 1, 1996, pp. 303-312.

Dai, A. et al., "Scannet: Richly-annotated 3d reconstructions of indoor scenes," Proceedings of the IEEE conference on computer vision and pattern recognition, Feb. 2017, pp. 5828-5839.

Drory, A. et al., "Semi-global matching: a principled derivation in terms of message passing," Pattern Recognition: 36th German Conference, GCPR 2014, Proceedings 36, Springer International Publishing, Oct. 15, 2014, pp. 43-53.

Duzceker, A. et al., "Deepvideomvs: Multi-view stereo on video with recurrent spatio-temporal fusion," Proceedings of the IEEE/CVF Conference on Computer Vision and Pattern Recognition, Dec. 2020, pp. 15324-15333.

Eigen, D. et al., "Depth map prediction from a single image using a multi-scale deep network," Advances in neural information processing systems, (27) Dec. 2014, pp. 1-9.

Facil, J.M. et al., "CAM-Convs: Camera-aware multi-scale convolutions for single-view depth," Proceedings of the IEEE/CVF Conference on Computer Vision and Pattern Recognition, Jun. 2019, pp. 11826-11835.

Fischer, P. et al., "FlowNet: Learning Optical Flow with Convolutional Networks," arXiv:1504.06852v2, May 4, 2015, pp. 1-13.

Furukawa, Y. et al., "Multi-view stereo: A tutorial," Foundations and Trends® in Computer Graphics and Vision, 9(1-2) Jun. 23, 2015, pp. 1-148.

Github, "huggingface/pytorch-image-models," May 11, 2023, 38 pages, [Online] [Retrieved on Jul. 20, 2023] Retrieved from the Internet URL: <https://github.com/huggingface/pytorch-image-models>.

Github, "Lightning-AI / lightning," Apr. 1, 2019, 14 pages, [Online] [Retrieved on Jul. 20, 2023] Retrieved from the Internet URL: <https://github.com/Lightning-AI/lightning>.

Glocker, B. et al., "Real-time RGB-D camera relocalization," 2013 IEEE International Symposium on Mixed and Augmented Reality (ISMAR), Oct. 1, 2013, pp. 173-179.

Godard, C. et al., "Unsupervised monocular depth estimation with left-right consistency," Proceedings of the IEEE conference on computer vision and pattern recognition, Nov. 9, 2017, pp. 270-279.

Godard, C. et al., "Digging into self-supervised monocular depth estimation," Proceedings of the IEEE/CVF international conference on computer vision, Jun. 2018, pp. 3828-3838.

Gu, X. et al., "Cascade Cost Volume for High-Resolution Multi-View Stereo and Stereo Matching," Proceedings of the IEEE/CVF conference on computer vision and pattern recognition, Jun. 2020, pp. 2495-2504.

He, K. et al., "Deep residual learning for image recognition," Proceedings of the IEEE conference on computer vision and pattern recognition, Jun. 2016, pp. 770-778.

Hirschmuller, H., "Stereo processing by semiglobal matching and mutual information," IEEE Transactions on pattern analysis and machine intelligence, 30(2) Dec. 18, 2007, pp. 328-341.

Hou, Y. et al., "Multi-view stereo by temporal nonparametric fusion," Proceedings of the IEEE/CVF International Conference on Computer Vision, Oct. 2019, pp. 2651-2660.

Huang, P.H. et al., "Deepmvs: Learning multi-view stereopsis," Proceedings of the IEEE Conference on Computer Vision and Pattern Recognition, Jun. 2018, pp. 2821-2830.

Im, S. et al., "Dpsnet: End-to-end deep plane sweep stereo," arXiv preprint arXiv:1905.00538, May 2, 2019, pp. 1-12.

Kähler, O. et al., "Hierarchical voxel block hashing for efficient integration of depth images," IEEE Robotics and Automation Letters, 1(1) Dec. 2015, pp. 192-197.

Kang, S.B. et al., "Handling occlusions in dense multi-view stereo," Proceedings of the 2001 IEEE Computer Society Conference on Computer Vision and Pattern Recognition, CVPR 2001, vol. 1. Dec. 8, 2001, pp. 1-35.

Kar, A. et al., "Learning a multi-view stereo machine," Advances in neural information processing systems (30) Dec. 2017, pp. 1-12.

Kazhdan, M. et al., "Poisson surface reconstruction," Proceedings of the fourth Eurographics symposium on Geometry processing, vol. 7, Jun. 2006, pp. 1-10.

Kendall, A. et al., "End-to-end learning of geometry and context for deep stereo regression," Proceedings of the IEEE international conference on computer vision, Oct. 2017, pp. 66-75.

Kuznietsov, Y. et al., "Comoda: Continuous monocular depth adaptation using past experiences," Proceedings of the IEEE/CVF Winter Conference on Applications of Computer Vision, Jan. 2021, pp. 2907-2917.

Lee, D.T. et al., "Two algorithms for constructing a Delaunay triangulation," International Journal of Computer & Information Sciences, vol. 9, No. 3, Jun. 1980, pp. 219-242.

Li, Z. et al., "Megadepth: Learning single-view depth prediction from internet photos," Proceedings of the IEEE conference on computer vision and pattern recognition, Jun. 2018, pp. 2041-2050.

Liang, Z. et al., "Learning for disparity estimation through feature constancy," Proceedings of the IEEE conference on computer vision and pattern recognition, Jun. 2018, pp. 2811-2820.

Lin, T.Y. et al., "Feature Pyramid Networks for Object Detection," Proceedings of the IEEE conference on computer vision and pattern recognition, Jul. 2017, pp. 2117-2125.

Long, X. et al., "Occlusion-Aware Depth Estimation with Adaptive Normal Constraints," arXiv:2004.00845v4, Jul. 12, 2021, pp. 1-17.

Lorensen, W.E. et al., "Marching cubes: A high resolution 3D surface construction algorithm," Seminal graphics: pioneering efforts that shaped the field, 1, 1998, pp. 347-353.

Loshchilov, I. et al., "Decoupled Weight Decay Regularization," arXiv:1711.05101v3, Jan. 4, 2019, pp. 1-19.

Lou, X. et al., "Consistent video depth estimation," ACM Transactions on Graphics (ToG), vol. 39, No. 4, Article 71, Jul. 8, 2020, pp. 1-13.

Marcel, S. et al., "Torchvision the machine-vision package of torch," Proceedings of the 18th ACM international conference on Multimedia, Oct. 25, 2010, pp. 1485-1488.

(56) References Cited

OTHER PUBLICATIONS

Mayer, N. et al., "A large dataset to train convolutional networks for disparity, optical flow, and scene flow estimation," Proceedings of the IEEE conference on computer vision and pattern recognition, Jun. 2016, pp. 4040-4048.
Mccraith, R. et al., "Monocular depth estimation with self-supervised instance adaptation," arXiv preprint arXiv:2004.05821, Apr. 13, 2020, pp. 1-7.
Mures, Z. et al., "Atlas: End-to-End 3D Scene Reconstruction from Posed Images," arXiv:2003.10432v3, Oct. 14, 2020, pp. 1-18.
Newcombe, R.A. et al., "Kinectfusion: Real-time dense surface mapping and tracking," 2011 10th IEEE international symposium on mixed and augmented reality, Oct. 26, 2011, pp. 127-136. Ieee.
Newcombe, R.A. et al., "DTAM: Dense Tracking and Mapping in Real-Time," 2011 international conference on computer vision, IEEE, Nov. 6, 2011, pp. 2320-2327.
Niebner, M. et al., "Real-time 3D reconstruction at scale using voxel hashing," ACM Transactions on Graphics (ToG), 32(6), Nov. 1, 2013, pp. 1-11.
Paszke, A. et al., "Pytorch: An imperative style, high-performance deep learning library," Advances in neural information processing systems, (32) Dec. 2019, pp. 1-12.
Patil, V. et al., "Don't Forget The Past: Recurrent Depth Estimation from Monocular Video," IEEE Robotics And Automation Letters, arXiv:2001.02613v2, Jul. 28, 2020, pp. 1-8.
Prisacariu, V.A. et al., "Infinitam v3: A framework for large-scale 3D reconstruction with loop closure," arXiv:1708.00783v1, Aug. 2, 2017, pp. 1-19.
Ranftl, R. et al., "Towards Robust Monocular Depth Estimation: Mixing Datasets for Zero-Shot Cross-Dataset Transfer," IEEE Transactions on pattern analysis and machine intelligence, vol. 44, No. 3, Mar. 2022, pp. 1623-1637.
Rich, A. et al., "3DVNet: Multi-View Depth Prediction and Volumetric Refinement," International Conference on 3D Vision, arXiv:2112.00202v1, Dec. 1, 2021, pp. 700-709.
Runz, M. et al., "Maskfusion: Real-time recognition, tracking and reconstruction of multiple moving objects," 2018 IEEE International Symposium on Mixed and Augmented Reality (ISMAR), arXiv:1804.09194v2, Oct. 22, 2018, pp. 10-20.
Sayed, M. et al., "SimpleRecon: 3D Reconstruction Without 3D Convolutions Supplementary Material," arXiv:2208.14743v1, Aug. 31, 2022, pp. 1-19.
Scharstein, D. et al., "A taxonomy and evaluation of dense two-frame stereo correspondence algorithms," Proceedings of the IEEE Workshop on Stereo and Multi-Baseline Vision, Dec. 2001, pp. 1-35.
Schonberger, J.L. et al., "Structure-from-motion revisited," Proceedings of the IEEE conference on computer vision and pattern recognition, Jun. 2016, pp. 4104-4113.
Schonberger, J.L. et al., "Pixelwise view selection for unstructured multi-view stereo," In: European Conference on Computer Vision (ECCV) 14th European Conference Proceedings, Part III 14, Oct. 2016, pp. 501-518.
Scona, R. et al., "Staticfusion: Background reconstruction for dense rgb-d slam in dynamic environments," 2018 IEEE international conference on robotics and automation (ICRA), IEEE, May 21, 2018, pp. 3849-3856.
Shu, C. et al., "Feature-metric Loss for Self-supervised Learning of Depth and Egomotion," European Conference on Computer Vision, arXiv:2007.10603v1, Jul. 21, 2020, pp. 572-588.
Sinha, A. et al., "DELTAS: Depth Estimation by Learning Triangulation And densification of Sparse points," Computer Vision—ECCV, Part XXI 16, arXiv:2003.08933v2, Aug. 25, 2020, pp. 104-121.
Sitzmann, V. et al., "Deepvoxels: Learning persistent 3d feature embeddings," Proceedings of the IEEE/CVF Conference on Computer Vision and Pattern Recognition, Jun. 2019, pp. 2437-2446.
Stier, N. et al., "Vortx: Volumetric 3d reconstruction with transformers for voxelwise view selection and fusion," 2021 International Conference on 3D Vision (3DV), IEEE. arXiv:2112.00236v1, Dec. 1, 2021, pp. 320-330.
Sun, J. et al., "NeuralRecon: Real-time coherent 3D reconstruction from monocular video," Proceedings of the IEEE/CVF Conference on Computer Vision and Pattern Recognition, Jun. 2021, pp. 15598-15607.
Tan, M. et al., "Mnasnet: Platform-aware neural architecture search for mobile, " Proceedings of the IEEE/CVF conference on computer vision and pattern recognition, Jun. 2019, pp. 2820-2828.
Tan, M. et al., "Efficientnetv2: Smaller models and faster training," International conference on machine learning, PMLR, Jul. 1, 2021, pp. 10096-10106.
Tananaev, D. et al., "Temporally consistent depth estimation in videos with recurrent architectures," Proceedings of the European Conference on Computer Vision (ECCV) Workshops, Sep. 2018, pp. 1-14.
Vaswani, A. et al., "Attention Is All You Need," Advances in neural information processing systems, (30) Dec. 2017, pp. 1-11.
Wang, K. et al., "Mvdepthnet: Real-time multiview depth estimation neural network," 2018 International conference on 3d vision (3DV), IEEE, arXiv:1807.08563v1, Jul. 23, 2018, pp. 248-257.
Watson, J. et al., "The Temporal Opportunist: Self-Supervised Multi-Frame Monocular Depth," Proceedings of the IEEE/CVF Conference on Computer Vision and Pattern Recognition, Jun. 2021, pp. 1164-1174.
Watson, J. et al., "Self-Supervised Monocular Depth Hints," Proceedings of the IEEE/CVF International Conference on Computer Vision, Oct. 2019, pp. 2162-2171.
Whelan, T. et al., "Kintinuous: Spatially extended KinectFusion," In: RSS Workshop on RGB-D: Advanced Reasoning with Depth Camera, Jul. 19, 2012, pp. 1-10.
Whelan, T. et al., "ElasticFusion: Dense SLAM without a pose graph," Robotics: Science and Systems, Jul. 13, 2015, pp. 1-9.
Wimbauer, F. et al., "MonoRec: Semi-supervised dense reconstruction in dynamic environments from a single moving camera," Proceedings of the IEEE/CVF Conference on Computer Vision and Pattern Recognition, Jun. 2021, pp. 6112-6122.
Yang, X. et al., "Mobile3DRecon: real-time monocular 3D reconstruction on a mobile phone," IEEE Transactions on Visualization and Computer Graphics, vol. 26, No. 12, Sep. 21, 2020, pp. 3446-3456.
Yao, Y. et al., "Mvsnet: Depth inference for unstructured multi-view stereo," Proceedings of the European conference on computer vision (ECCV), Sep. 2018, pp. 767-783.
Yee, K. et al., "Fast deep stereo with 2D convolutional processing of cost signatures," Proceedings of the IEEE/CVF Winter Conference on Applications of Computer Vision, Mar. 2020, pp. 183-191.
Yin, W. et al., "Enforcing geometric constraints of virtual normal for depth prediction," Proceedings of the IEEE/CVF International Conference on Computer Vision, Oct. 2019, pp. 5684-5693.
Yin, W. et al., "Learning to recover 3d scene shape from a single image," Proceedings of the IEEE/CVF Conference on Computer Vision and Pattern Recognition, Jun. 2021, pp. 204-213.
Zbontar, J. et al., "Stereo matching by training a convolutional neural network to compare image patches," J. Mach. Learn. Res., 17(1), Jan. 1, 2016, pp. 2287-2318.
Zhang, F. et al., "Ga-net: Guided aggregation net for end-to-end stereo matching," Proceedings of the IEEE/CVF Conference on Computer Vision and Pattern Recognition, Oct. 2019 pp. 185-194.
Zhang, F. et al., "Domain-invariant stereo matching networks," Computer Vision—ECCV 2020: 16th European Conference, Proceedings, Part II 16, arXiv:1911.13287v1, Nov. 29, 2019, pp. 420-439.
Zhao, Y. et al., "Camera pose matters: Improving depth prediction by mitigating pose distribution bias," Proceedings of the IEEE/CVF Conference on Computer Vision and Pattern Recognition, Jun. 19, 2021, pp. 15759-15768.

(56) References Cited

OTHER PUBLICATIONS

Zhou, Z. et al., “UNet++: A Nested U-Net Architecture for Medical Image Segmentation,” Deep Learn Med Image Anal Multimodal Learn Clin Decis Support, Sep. 20, 2018, pp. 3-11.

* cited by examiner

FIG. 3

Feature Volume 510
f = [f0, ⟨f⟩1, ..., ⟨f⟩N]
d = [f0 · ⟨f⟩1, ..., f0 · ⟨f⟩N]
r = [r0, ..., rN]
θ = [θ0,1, ..., θ0,N]
z = [z0, ..., zN]
p = [p0,1, ..., p0,N]
m = [m0, ..., mN]
features
Visual Features
dot products
rays
angles
depths
pose distances
masks
Metadata Reference Image Camera 535
Source Image Camera 543
Point in Space 537
Depth Planes 539
Reference Camera Field of View (FOV) 541
z0
zn
r0
rn
θ0,n
p0,n Reference Images:

ESTDepth:

DVMVS:

Our Model:

GT Depth:

GT

DVMVS

Reference Images

Our Model

IDNSolver

3D RECONSTRUCTION WITHOUT 3D CONVOLUTIONS

CROSS REFERENCE TO RELATED APPLICATIONS

This application claims priority to U.S. Provisional Application No. 63/339,090, titled "3D Reconstruction Witposehout 3D Convolutions" filed on May 6, 2022, which is incorporated herein by reference.

BACKGROUND

1 Technical Field

The subject matter described relates generally to estimating a depth map for input images, and, in particular, to a machine-learned model for estimating the depth map.

2. Problem

Three dimensional (3D) scene reconstruction has applications in both navigation and scene understanding. Three dimensional (3D) scene reconstruction from posed images may occur in two phases: per-image depth estimation, followed by depth merging and surface reconstruction. Recently, a family of methods have emerged that perform reconstruction directly in final 3D volumetric feature space. While these methods have shown impressive reconstruction results, they rely on expensive 3D convolutional layers, limiting their application in resource-constrained environments, such as smartphones.

SUMMARY

Aspects of this disclosure relate to using high quality multi-view depth predictions to generate highly accurate 3D reconstructions using depth fusion. This disclosure describes a state-of-the-art multi-view depth estimator with at least two contributions over preexisting methods: 1) a carefully designed 2D CNN (convolutional neural network) which utilizes strong image priors alongside a plane-sweep feature volume and geometric losses, combined with 2) the integration of keyframe and geometric metadata into a cost volume which allows informed depth plane scoring. Embodiments may achieve a significant lead over the current state-of-the-art techniques for depth estimation and close or better for 3D reconstruction on ScanNet and 7-Scenes data sets, yet embodiments may still allow for online real-time low-memory reconstruction. While some embodiments produce state-of-the-art depth estimations and 3D reconstructions without the use of expensive 3D convolutions, embodiments do not preclude the use of 3D convolutions or additional cost volume and depth refinement techniques, thus allowing room for further improvements when computation is less restricted.

In some aspects, the techniques described herein relate to a method including: receiving a reference image of an environment and a set of one or more source images (also referred to as keyframes) of the environment; receiving image features for the reference image and the set of source images; generating a 4D feature volume that includes the image features and metadata associated with the reference and set of source images, the image features and the metadata may be arranged in the 4D feature volume based on relative pose distances between the reference image and the set of source images; reducing the 4D feature volume to generate a 3D cost volume; and applying a depth estimation model to the 3D cost volume and data based on the reference image to generate a two dimensional (2D) depth map for the reference image.

Other aspects include components, devices, systems, improvements, methods, processes, applications, computer readable mediums, and other technologies related to any of the above.

BRIEF DESCRIPTION OF THE DRAWINGS

FIG. 3 is a block diagram of a networked computing environment suitable for estimating a depth map or 3D scene reconstructions, according to one embodiment.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world. The subject matter described is applicable in other situations where generating depth information is desirable. In addition, the inherent flexibility of computer-based systems allows for a great variety of possible configurations, combinations, and divisions of tasks and functionality between and among the components of the system.

1 Example Location-Based Parallel Reality Game

Figure 1:
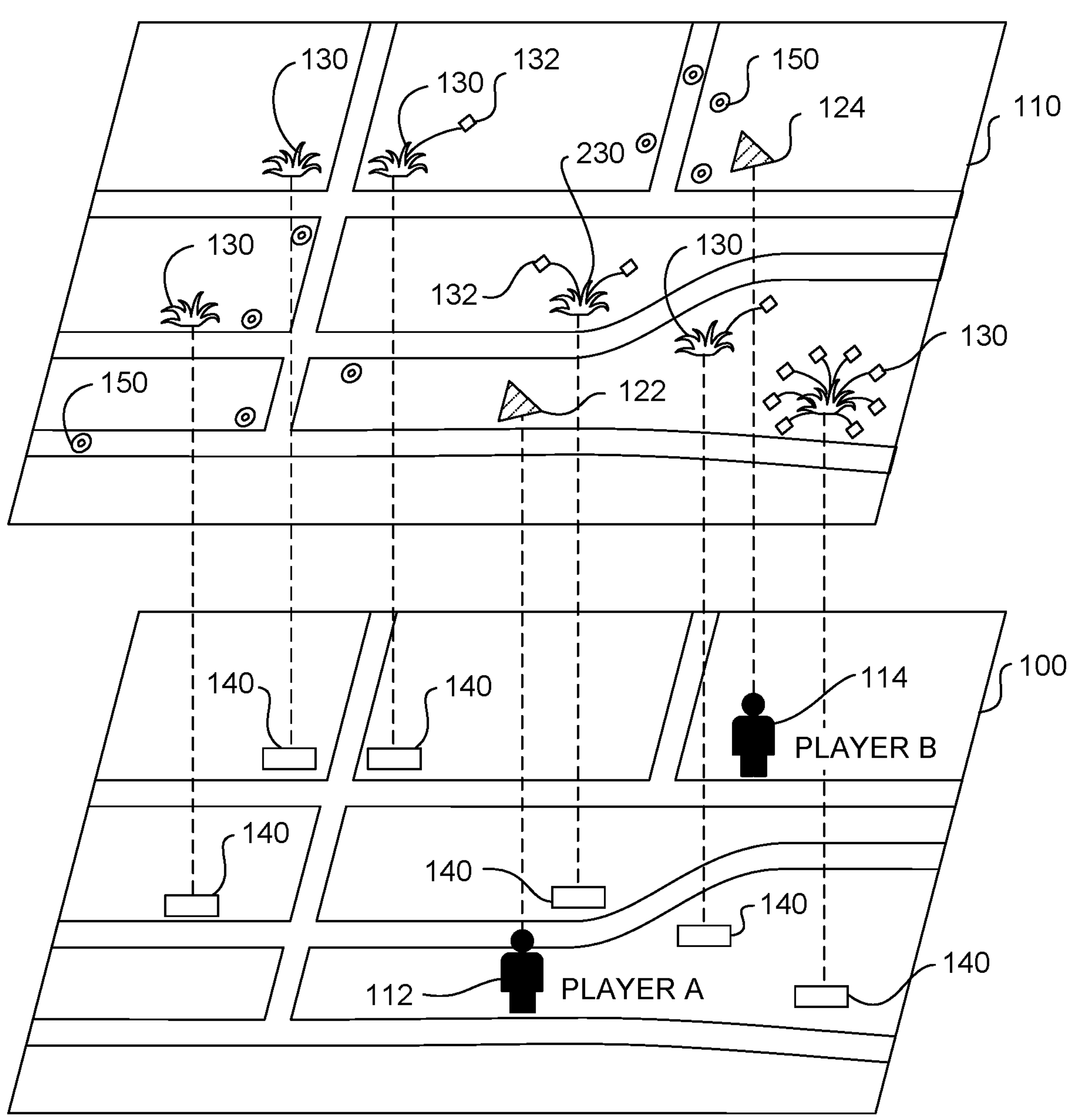
FIG. 1 depicts a representation of a virtual world having a geography that parallels the real world, according to one embodiment.

FIG. 1 is a conceptual diagram of a virtual world 110 that parallels the real world 100. The virtual world 110 can act as the game board for players of a parallel reality game. As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110. The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system, a localization system, or both) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include game objectives requiring players to travel to or interact with various virtual elements or virtual objects scattered at various virtual locations in the virtual world 110. A player can travel to these virtual locations by traveling to the corresponding location of the virtual elements or objects in the real world 100. For instance, a positioning system can track the position of the player such that as the player navigates the real world 100, the player also navigates the parallel virtual world 110. The player can then interact with various virtual elements and objects at the specific location to achieve or perform one or more game objectives.

A game objective may have players interacting with virtual elements 130 located at various virtual locations in the virtual world 110. These virtual elements 130 can be linked to landmarks, geographic locations, or objects 140 in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives may require that players use one or more virtual items that are collected by the players in the location-based game. For instance, the players may travel the virtual world 110 seeking virtual items 132 (e.g., weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may have to gather virtual energy as part of the parallel reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing their locations.

Figure 2:
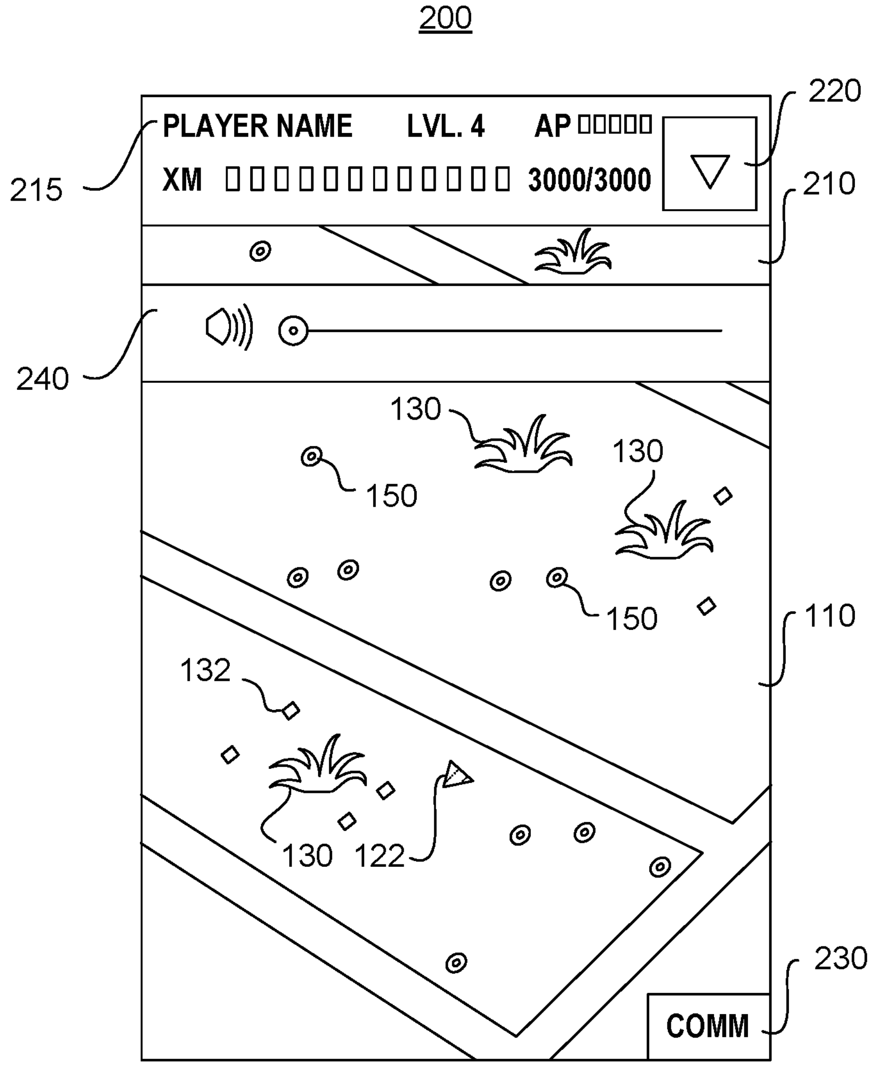
FIG. 2 depicts an exemplary game interface of a parallel reality game, according to one embodiment.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel reality game.

According to aspects of the present disclosure, a player can interact with the parallel reality game by carrying a client device around in the real world. For instance, a player can play the game by accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a user to interact with the game. For instance, the game interface can provide audible notifications to the player when the player is approaching a virtual element or object in the game or when an important event happens in the parallel reality game. In some embodiments, a player can control these audible notifications with audio control 240. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

2. Example Gaming System

Figure 3:
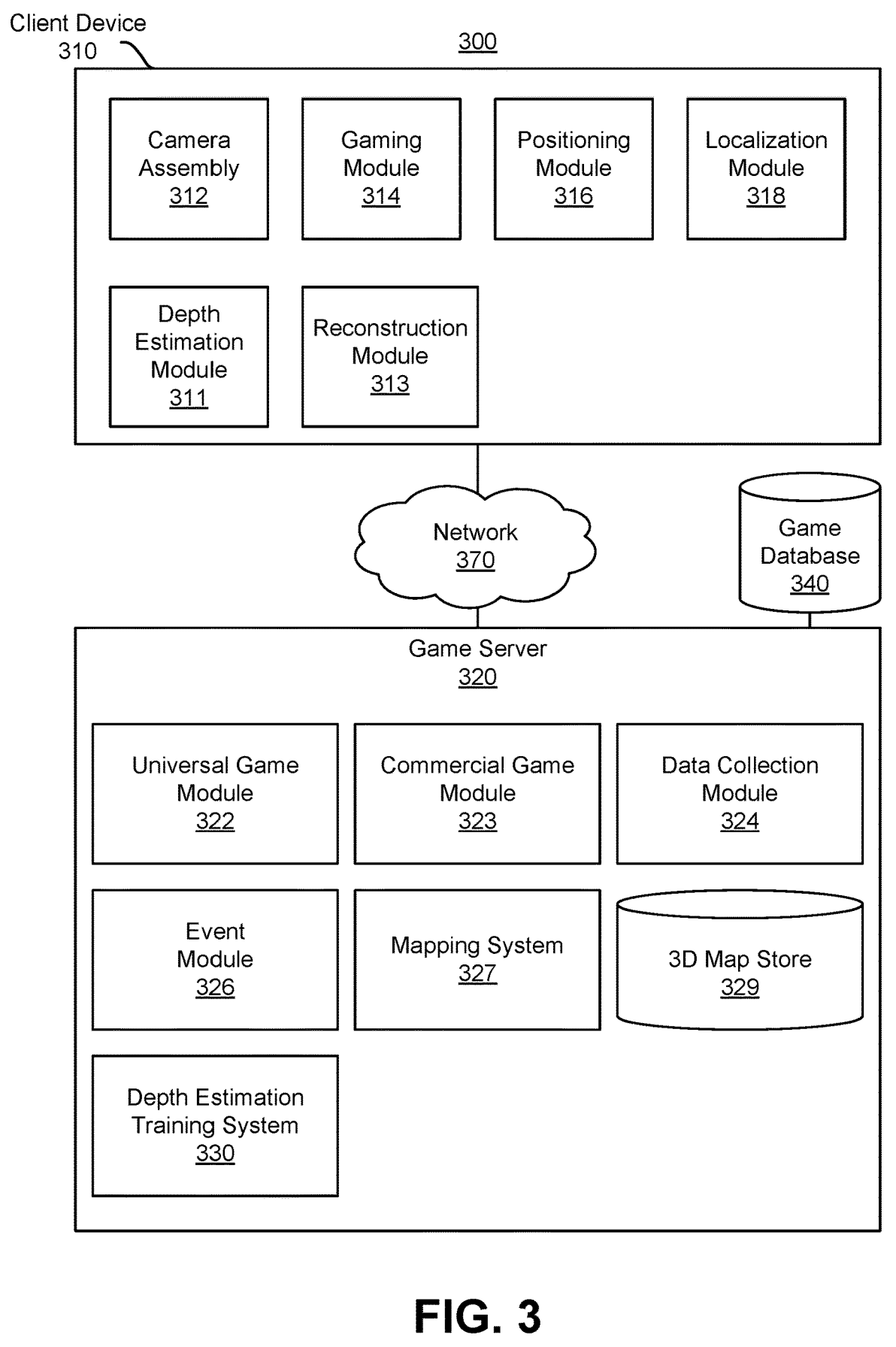

FIG. 3 illustrates one embodiment of a networked computing environment 300. The networked computing environment 300 uses a client-server architecture, where a game server 320 communicates with a client device 310 over a network 370 to provide a parallel reality game to a player at the client device 310. The networked computing environment 300 also may include other external systems such as sponsor/advertiser systems or business systems. Although only one client device 310 is shown in FIG. 3, any number of client devices 310 or other external systems may be connected to the game server 320 over the network 370. Furthermore, the networked computing environment 300 may contain different or additional elements and functionality may be distributed between the client device 310 and the server 320 in different manners than described below.

The networked computing environment 300 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 310 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 310.

A client device 310 can be any portable computing device capable for use by a player to interface with the game server 320. For instance, a client device 310 is preferably a portable wireless device that can be carried by a player, such as a smartphone, portable gaming device, augmented reality (AR) headset, cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the game server 320 to provide sensory data of a physical environment. In one embodiment, the client device 310 includes a camera assembly 312, a depth estimation module 311, a gaming module 314, positioning module 316, and localization module 318. The client device 310 also includes a network interface (not shown) for providing communications over the network 370. In various embodiments, the client device 310 may include different or additional components, such as additional sensors, display, and software modules, etc.

The camera assembly 312 includes one or more cameras which can capture image data. The cameras capture image data describing a scene of the environment surrounding the client device 310 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video.

The depth estimation module 311 receives an input image of a scene (also referred to as a "reference image"), for example, captured by the camera assembly 312. The depth estimation module 311 may also receive a set of one or more additional images of the scene (also referred to as "source images" or "keyframes"), for example captured by the camera assembly 312. The source images may have a close temporal relationship to the input image (e.g., the frames of a monocular video from which the input image is taken that immediately precede or follow the input image). The depth estimation module 311 includes one or more models that process the input and output a depth map of the scene based on the input image and the additional images. The depth estimation module 311 may be trained by the depth estimation training system 330 and can be updated or adjusted by the depth estimation training system 330, which is discussed in greater detail below.

The depth estimation module 311 may be implemented with one or more machine learning algorithms. Machine learning algorithms that may be used for the depth estimation module 311 include neural networks, decision trees, random forest, regressors, clustering, other derivative algorithms thereof, or some combination thereof. In one or more embodiments, the depth estimation module 311 is structured to include a neural network comprising a plurality of layers including at least an input layer configured to receive the input image and additional images and an output layer configured to output the depth prediction. Each layer comprises a multitude of nodes, each node defined by a weighted combination of one or more nodes in a prior layer. The weights defining nodes subsequent to the input layer are determined during training by the depth estimation training system 330. Additional details of the depth estimation module 311 are provided with respect with FIG. 5.

The reconstruction module 313 can generate a 3D representation of an environment based on depth maps from the depth estimation module 311. For example, the reconstruction module 313 fuses multiple depth maps of an environment to generate the 3D representation of the environment.

The client device 310 may also include additional sensors for collecting data regarding the environment surrounding the client device, such as movement sensors, accelerometers, gyroscopes, barometers, thermometers, light sensors, microphones, etc. The image data captured by the camera assembly 312 can be appended with metadata describing other information about the image data, such as additional sensory data (e.g. temperature, brightness of environment, air pressure, location, pose etc.) or capture data (e.g. exposure length, shutter speed, focal length, capture time, etc.).

The gaming module 314 provides a player with an interface to participate in the parallel reality game. The game server 320 transmits game data over the network 370 to the client device 310 for use by the gaming module 314 to provide a local version of the game to a player at locations remote from the game server. In one embodiment, the gaming module 314 presents a user interface on a display of the client device 310 that depicts a virtual world (e.g. renders imagery of the virtual world) and allows a user to interact with the virtual world to perform various game objectives. In some embodiments, the gaming module 314 presents images of the real world (e.g., captured by the camera assembly 312) augmented with virtual elements from the parallel reality game. In these embodiments, the gaming module 314 may generate or adjust virtual content according to other information received from other components of the client device 310. For example, the gaming module 314 may adjust a virtual object to be displayed on the user interface according to a depth map of the scene captured in the image data.

The gaming module 314 can also control various other outputs to allow a player to interact with the game without requiring the player to view a display screen. For instance, the gaming module 314 can control various audio, vibratory, or other notifications that allow the player to play the game without looking at the display screen.

The positioning module 316 can be any device or circuitry for determining the position of the client device 310. For example, the positioning module 316 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 310 in the real world, the positioning module 316 tracks the position of the player and provides the player position information to the gaming module 314. The gaming module 314 updates the player position in the virtual world associated with the game based on the actual position of the player in the real world. Thus, a player can interact with the virtual world simply by carrying or transporting the client device 310 in the real world. In particular, the location of the player in the virtual world can correspond to the location of the player in the real world. The gaming module 314 can provide player position information to the game server 320 over the network 370. In response, the game server 320 may enact various techniques to verify the location of the client device 310 to prevent cheaters from spoofing their locations. It should be understood that location information associated with a player is utilized only if permission is granted after the player has been notified that location information of the player is to be accessed and how the location information is to be utilized in the context of the game (e.g. to update player position in the virtual world). In addition, any location information associated with players is stored and maintained in a manner to protect player privacy.

The localization module 318 provides an additional or alternative way to determine the location of the client device 310. In one embodiment, the localization module 318 receives the location determined for the client device 310 by the positioning module 316 and refines it by determining a pose of one or more cameras of the camera assembly 312. The localization module 318 may use the location generated by the positioning module 316 to select a 3D map of the environment surrounding the client device 310 and localize against the 3D map. The localization module 318 may obtain the 3D map from local storage or from the game server 320. The 3D map may be a point cloud, mesh, or any other suitable 3D representation of the environment surrounding the client device 310. Alternatively, the localization module 318 may determine a location or pose of the client device 310 without reference to a coarse location (such as one provided by a GPS system), such as by determining the relative location of the client device 310 to another device.

In one embodiment, the localization module 318 applies a trained model to determine the pose of images captured by the camera assembly 312 relative to the 3D map. Thus, the localization model can determine an accurate (e.g., to within a few centimeters and degrees) determination of the position and orientation of the client device 310. The position of the client device 310 can then be tracked over time using dad reckoning based on sensor readings, periodic re-localization, or a combination of both. Having an accurate pose for the client device 310 may enable the gaming module 314 to present virtual content overlaid on images of the real world (e.g., by displaying virtual elements in conjunction with a real-time feed from the camera assembly 312 on a display) or the real world itself (e.g., by displaying virtual elements on a transparent display of an AR headset) in a manner that gives the impression that the virtual objects are interacting with the real world. For example, a virtual character may hide behind a real tree, a virtual hat may be placed on a real statue, or a virtual creature may run and hide if a real person approaches it too quickly.

The game server 320 includes one or more computing devices that provide game functionality to the client device 310. The game server 320 can include or be in communication with a game database 340. The game database 340 stores game data used in the parallel reality game to be served or provided to the client device 310 over the network 370.

The game data stored in the game database 340 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); or (8) any other data used, related to, or obtained during implementation of the parallel reality game. The game data stored in the game database 340 can be populated either offline or in real time by system administrators or by data received from users (e.g., players), such as from a client device 310 over the network 370.

In one embodiment, the game server 320 is configured to receive requests for game data from a client device 310 (for instance via remote procedure calls (RPCs)) and to respond to those requests via the network 370. The game server 320 can encode game data in one or more data files and provide the data files to the client device 310. In addition, the game server 320 can be configured to receive game data (e.g., player positions, player actions, player input, etc.) from a client device 310 via the network 370. The client device 310 can be configured to periodically send player input and other updates to the game server 320, which the game server uses to update game data in the game database 340 to reflect any and all changed conditions for the game.

In the embodiment shown in FIG. 3, the game server 320 includes a universal game module 322, a commercial game module 323, a data collection module 324, an event module 326, a mapping system 327, a depth estimation training system 330, and a 3D map store 329. As mentioned above, the game server 320 interacts with a game database 340 that may be part of the game server or accessed remotely (e.g., the game database 340 may be a distributed database accessed via the network 370). In other embodiments, the game server 320 contains different or additional elements. In addition, the functions may be distributed among the elements in a different manner than described.

The universal game module 322 hosts an instance of the parallel reality game for a set of players (e.g., all players of the parallel reality game) and acts as the authoritative source for the current status of the parallel reality game for the set of players. As the host, the universal game module 322 generates game content for presentation to players (e.g., via their respective client devices 310). The universal game module 322 may access the game database 340 to retrieve or store game data when hosting the parallel reality game. The universal game module 322 may also receive game data from client devices 310 (e.g. depth information, player input, player position, player actions, landmark information, etc.) and incorporates the game data received into the overall parallel reality game for the entire set of players of the parallel reality game. The universal game module 322 can also manage the delivery of game data to the client device 310 over the network 370. In some embodiments, the universal game module 322 also governs security aspects of the interaction of the client device 310 with the parallel reality game, such as securing connections between the client device and the game server 320, establishing connections between various client devices, or verifying the location of the various client devices 310 to prevent players cheating by spoofing their location.

The commercial game module 323 can be separate from or a part of the universal game module 322. The commercial game module 323 can manage the inclusion of various game features within the parallel reality game that are linked with a commercial activity in the real world. For instance, the commercial game module 323 can receive requests from external systems such as sponsors/advertisers, businesses, or other entities over the network 370 to include game features linked with commercial activity in the real world. The commercial game module 323 can then arrange for the inclusion of these game features in the parallel reality game on confirming the linked commercial activity has occurred. For example, if a business pays the provider of the parallel reality game an agreed upon amount, a virtual object identifying the business may appear in the parallel reality game at a virtual location corresponding to a real-world location of the business (e.g., a store or restaurant).

The data collection module 324 can be separate from or a part of the universal game module 322. The data collection module 324 can manage the inclusion of various game features within the parallel reality game that are linked with a data collection activity in the real world. For instance, the data collection module 324 can modify game data stored in the game database 340 to include game features linked with data collection activity in the parallel reality game. The data collection module 324 can also analyze data collected by players pursuant to the data collection activity and provide the data for access by various platforms.

The event module 326 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The mapping system 327 generates a 3D map of a geographical region based on a set of images. The 3D map may be a point cloud, polygon mesh, or any other suitable representation of the 3D geometry of the geographical region. The 3D map may include semantic labels providing additional contextual information, such as identifying objects tables, chairs, clocks, lampposts, trees, etc.), materials (concrete, water, brick, grass, etc.), or game properties (e.g., traversable by characters, suitable for certain in-game actions, etc.). In one embodiment, the mapping system 327 stores the 3D map along with any semantic/contextual information in the 3D map store 329. The 3D map may be stored in the 3D map store 329 in conjunction with location information (e.g., GPS coordinates of the center of the 3D map, a ringfence defining the extent of the 3D map, or the like). Thus, the game server 320 can provide the 3D map to client devices 310 that provide location data indicating they are within or near the geographic area covered by the 3D map.

The depth estimation training system 330 trains one or more models used by the depth estimation module 311 or the reconstruction module 313 (e.g., a depth estimation model). For example, the depth estimation training system 330 receives sets of images for use in training a depth estimation model of the depth estimation module 311. Once the one or models of the depth estimation module 311 are trained, the depth estimation module 311 receives image data and outputs depth information of the environment based on the image data. The depth estimates may have various uses, such as aiding in the rendering of virtual content to augment real world imagery, assisting navigation of robots, detecting potential hazards for autonomous vehicles, and the like. Additional training details are further provided below. Note that, although the depth estimation training system 330 is shown as part of the game server 320 for convenience, some or all of the models may be trained by other computing devices and provided to client devices 310 in various ways, including being part of the operating system, included in a gaming application, or accessed in the cloud on demand.

The network 370 can be any type of communications network, such as a local area network (e.g. intranet), wide area network (e.g. Internet), or some combination thereof. The network can also include a direct connection between a client device 310 and the game server 320. In general, communication between the game server 320 and a client device 310 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

3. Introduction to Depth Estimation and 3D Reconstruction

Generating 3D reconstructions of an environment is a challenging problem in computer vision, which is useful for tasks such as robotic navigation, autonomous driving, content placement for augmented reality and historical preservation. In some techniques, such 3D reconstructions are generated from 2D depth maps obtained using multi-view stereo (MVS), which are then fused into a 3D representation from which a surface is extracted. Recent advances in deep learning have enabled convolutional methods. These methods use 3D convolutions to smooth and regularize a cost volume, which performs well in practice but is expensive in both time and memory. This precludes their use on low power hardware (e.g., smartphones), where overall compute energy and memory are limited. The same is true of depth estimators which use LSTMs (Long Short-Term Memory recurrent neural networks) and Gaussian processes for improved depth accuracy.

Figure 8:
FIG. 8 illustrates 3D reconstructions that include unseen environments, according to some embodiments.

To address these and other problems, a 2D CNN (convolutional neural network) augmented with a cost volume may be used. Using this approach, state-of-the-art depth accuracy may be obtained at lower cost than using previous methods. This approach may also give competitive scores in 3D scene reconstruction without using expensive 3D convolutions. One aspect of these techniques is the novel incorporation of (e.g., computationally cheap) metadata into the cost volume, which significantly improves depth and reconstruction quality. Contributions may include: (1) the integration of keyframe and geometric metadata into the cost volume using a multi-level perceptron (MLP), which allows informed depth plane scoring, and (2) a 2D CNN that utilizes strong image priors alongside a plane-sweep 3D feature volume and geometric losses. The disclosed techniques have been evaluated against recent published methods on the challenging ScanNetv2 dataset on both depth estimation and 3D scene reconstruction (See Section 5). Furthermore, these techniques generalize on the 7-Scenes data (Table 1) and generalize on casually captured footage (FIG. 8).

By combining the novel cost volume metadata with principled architectural decisions that result in better depth predictions, the computational cost associated with 3D convolutions may be avoided, enabling use in embedded and resource-constrained environments.

Figure 4:
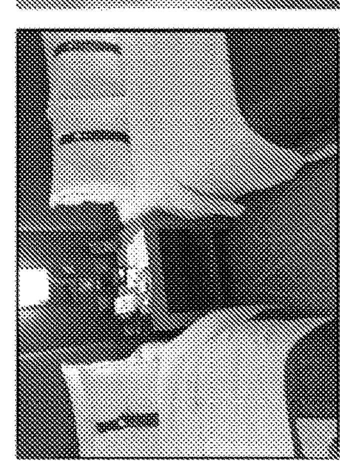
FIG. 4 illustrates depth predictions and 3D reconstructions generated by various models, according to some embodiments.
Figure 4:
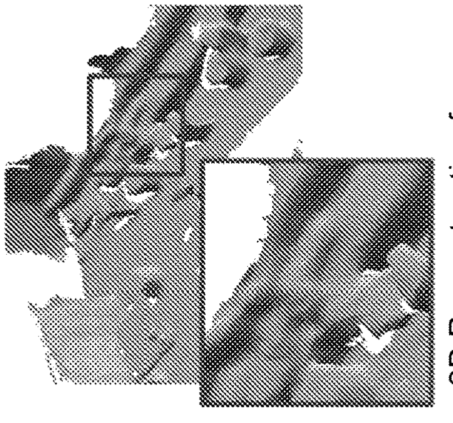
Figure 4:
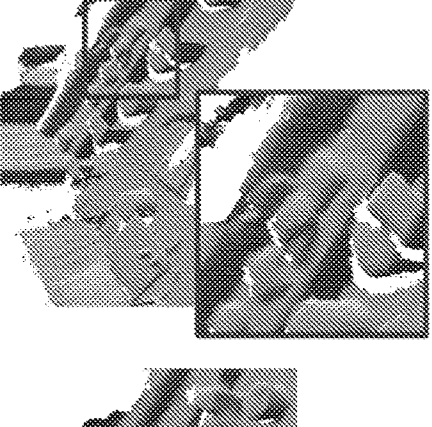
Figure 4:
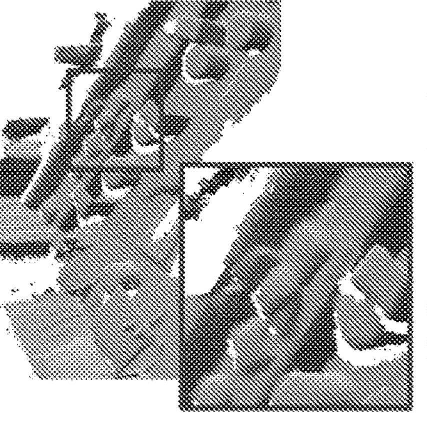
Figure 4:
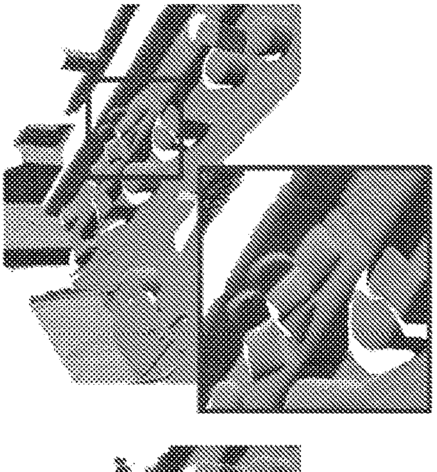

FIG. 4 includes a set of images that demonstrate improvements of the disclosed techniques relative to prior techniques. Specifically, the disclosed techniques significantly improve upon previous state-of-the-art monocular MVS methods (e.g., DVMS Depth[3]) and more closely match the GT (ground truth) depth in depth prediction and match volumetric state-of-the-art methods in full scene reconstruction (e.g., VoRTX Mesh[28]) and more closely match the GT Mesh. More specifically the depth predictions of the "depth map from our model" have sharper edges and less blurriness. Furthermore, the edges more accurately match the edges in the input "reference image". The colormapping also shows that the overall depth accuracy is better than prior work. Additionally, details are present in "our model" are not present in the other works e.g., the separate items on top of the microwave in the first column and the ruffles in the curtains in the fourth column.

4. Example Methods

A depth estimation module 311 may take as input a reference image $I^0$ of an environment, a set of source images $I^{n \in \{1, \ldots N-1\}}$ captured from other locations in the environment, and image intrinsics and relative poses of the camera(s) that captured the images. To train the depth estimation module 311, a ground truth depth map $D^{gt}$ aligned with each image may be used. At test time, the aim is to predict dense depth maps $\hat{D}$ for each reference image.

4.1 Method Overview

Figure 5A:
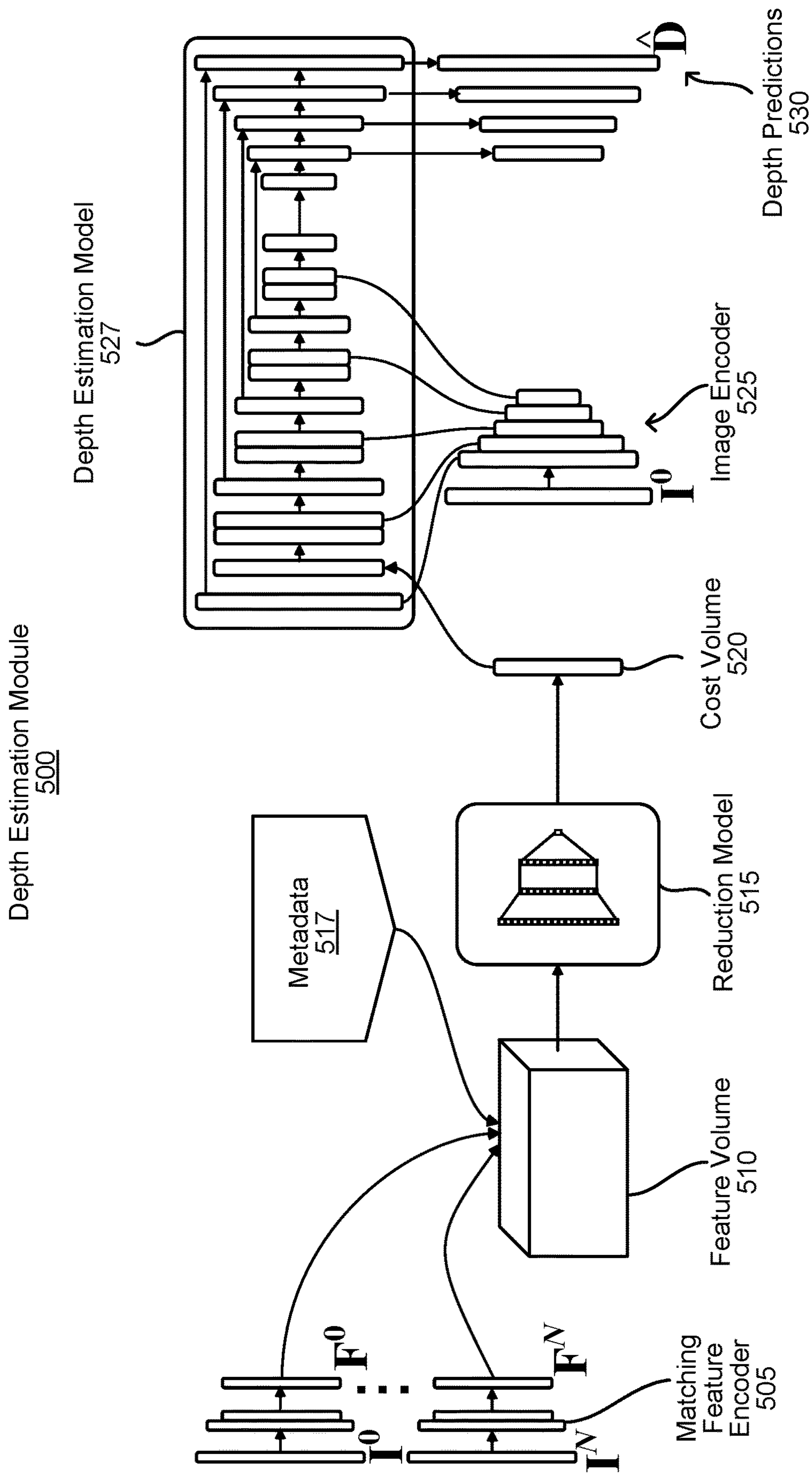
FIG. 5A is a diagram of a depth estimation module, according to some embodiments.

FIG. 5A is a diagram of a depth estimation module 500, according to some embodiments. The depth estimation module 500 may be an example of the depth estimation module 311 and the depth estimation module 500 may be trained by the depth estimation training system 330. In the example of FIG. 5A, the depth estimation module 500 includes a matching feature encoder 505, a reduction model 515, an image encoder 525, and a depth estimation model 527. The depth estimation model 527 includes a depth prediction encoder-decoder architecture augmented with a cost volume 520. In other embodiments, the depth estimation module 500 may include additional components, different components, or fewer components than as described and illustrated.

Reference image $I^0$ and source images $I^{n \in \{1, \ldots, N-1\}}$ are input into a matching feature encoder 505, which is a feature extractor model. The matching feature encoder 505 extracts matching features from the reference and source images $F^{n \in \{0, \ldots, N-1\}}$ for input into a 4D feature volume 510 (the notation F denotes a H×W×C, volume of these features while the notation f denotes a single vector). A matching feature is a pixel-aligned (at some image scale) vector generated from an image. The matching features may be used (e.g., by the reduction model 515) to match points from the reference image and source images together. The feature volume 510 also includes metadata 517, such as pose distance, ray information, depths from cameras, and a validity mask (further described below). The feature volume 510 may be a 4D tensor with dimensions C×D×H×W, where D is the number of depth planes, C is the number of metadata channels, H is based on the height of the input image, and W is based on the width of the input image. In some examples, H (or W) is equal to, or a fraction of, the height (or width) of the input image. For example, $H=(H_{input\ image}/8)$ or $W=(W_{input\ image}/8)$.

The feature volume 510 is reduced by a reduction model 515 to generate a 3D cost volume 520 with dimensions D×H×W, where D, H, and W represent the same quantities as the feature volume 510. The reduction model 515 processes the metadata channels to reduce them into a single scalar value for each location (k, i, j). Said differently, the reduction model 515 performs a reduction along the first dimension of the cost volume, reducing each "cell" of C values into a single value, resulting in a D×H×W volume. The scalar may represent a likelihood that the depth of an object represented by pixel i, j of the reference image is equal to the kth depth plane (k, i, j are indices of the cost volume and they represent points in the external environment. Specifically, there is a mapping of each point (k, i, j) to (x, y, z) coordinates in 3D space of the external environment). The reduction model 515 may be a parallel MLP (multi-level perception) reduction. For example, the reduction model 515 is a 1×1×1 convolutional layer. In some embodiments, each volumetric cell of metadata is reduced in parallel via an MLP.

The image encoder 525 is another feature extractor model. The image encoder 525 receives the reference image $I^0$ and generates features of the reference image (these may be different than the features generated by the matching feature encoder 505). The cost volume 520 and the features from the image encoder 525 are applied to the depth estimation model 527, which may have an encoder-decoder architecture (e.g., it is a 2D convolutional network), and outputs one or more (e.g., multi-scale) depth maps $\hat{D}$ 530. Among other advantages, having two different feature extractor models (505 and 525) may result in the depth estimation module 500 generating more accurate depth maps (while the exact reasons for this are not clear, it is possible that the kind of image features that work best for matching points in space (those generated by 505) may likely not be the image features that work best for regularizing the cost volume (those generated by 525).

Among other advantages, injecting (e.g., easily computable) metadata into the feature volume 510 allows the depth estimation model 527 to access useful information such as geometric and relative camera pose information. By incorporating this previously unexploited information, the depth estimation module 500 is able to significantly outperform previous methods on depth prediction (e.g., without the need for costly 4D cost volume reductions, complex temporal fusion, or Gaussian processes).

The following section describes the novel metadata component and explains how it is incorporated into the network architecture of the depth estimation model 527.

4.2 Improving the Cost Volume with Metadata

In traditional techniques for determining depth maps or 3D reconstruction, there exists helpful information which is typically ignored. In contrast, in this disclosure, (e.g., easily computable) metadata is incorporated into the feature volume 510, allowing the depth estimation model 527 to aggregate information across views in an informed manner. This can be done both explicitly via appending extra feature channels into the feature volume 510 and implicitly via enforcing specific metadata ordering in the feature volume 510.

The metadata may be injected into the depth estimation model 527 by augmenting image-level features inside the feature volume 510 with additional metadata channels. These channels encode information about the 3D relationship between the images used to build the feature volume 510, allowing for improved performance of the depth estimation module 500. For example, these additional metadata channels allow the depth estimation model 527 to better determine the relative importance of each source image for estimating depth for a particular pixel.

Figures 5B, 5C:
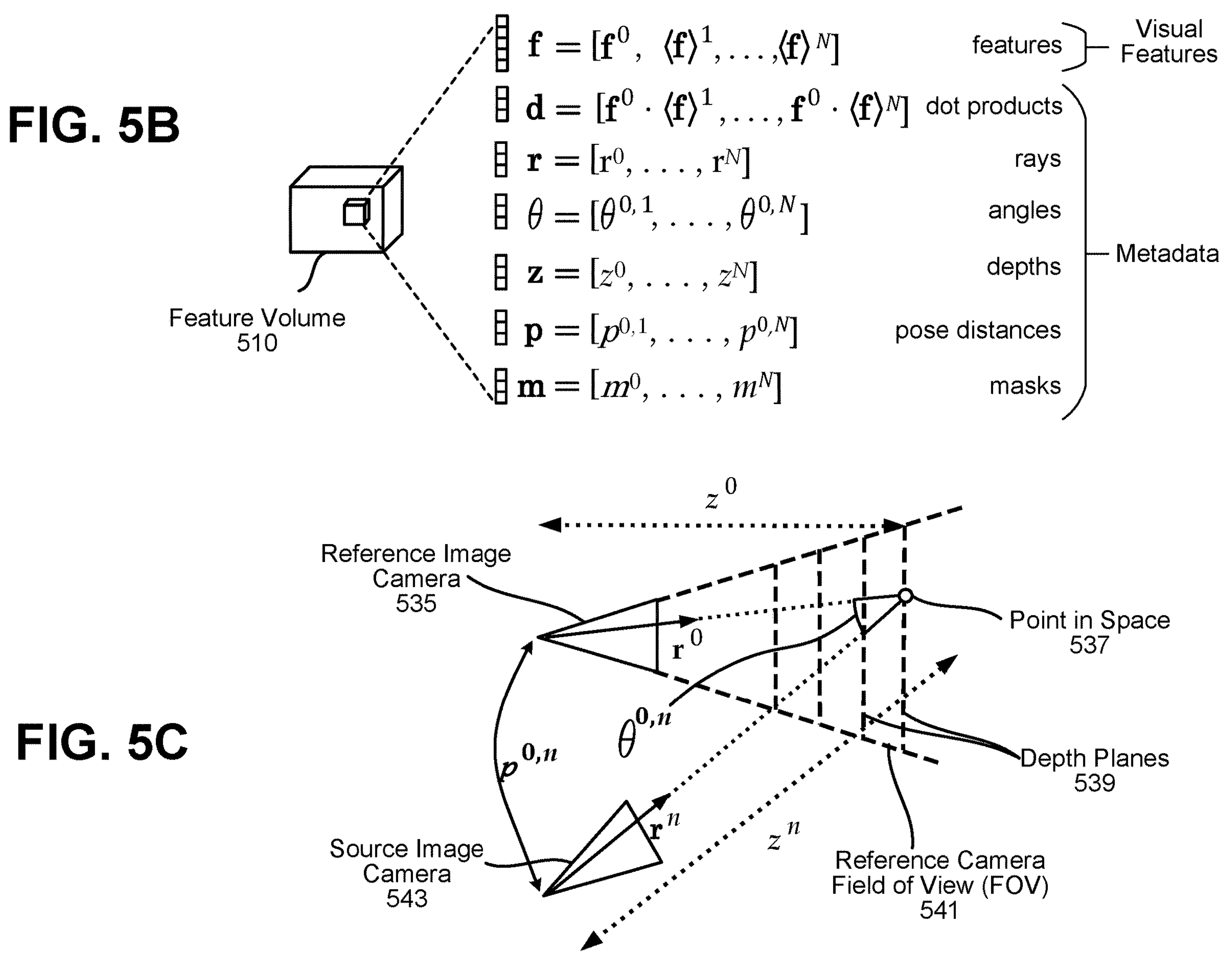
FIG. 5B is a diagram of a feature volume, according to some embodiments.
FIG. 5C is a geometric diagram that illustrates metadata components for a reference image and a source image, according to some embodiments.

FIG. 5B is a diagram of feature volume 510, according to some embodiments. FIG. 5B also includes an example list of metadata components that may be included in the feature volume 501. The cost volume 510 is a 4D tensor of dimension C×D×H×W, where for each spatial location (k, i, j) of the feature volume 510 (k is the depth plane index), there is a C dimensional feature vector (note that indices (k, i, j) are omitted from FIG. 5B for clarity). This C dimensional feature vector may comprise (1) reference image features $$f^0_{k,i,j},$$

(2) a set of one or more warped source image features $$\langle f \rangle^n_{k,i,j}$$

for n∈[1, N], where ⟨ ⟩ indicates that the features are perspective-warped into the reference frame of the reference image, (3) one or more of the metadata components (which may be computed by the depth estimation module 500), or (4) some combination thereof. The warped source image features $$\langle f \rangle^n_{k,i,j}$$

may be computed by: (1) computing image features $\langle f \rangle^n$ for every source view $I^{n \in \{1, \ldots, N-1\}}$ using a matching feature encoder (e.g., 505) and (2) warping the image features into the reference view's frustum at each depth plane via plane sweep stereo to produce $$\langle f \rangle^n_{k,i,j}$$

where k is the depth plane in the reference camera's view where the features are warped to, and i,j are 2D spatial coordinates in the reference camera's frame.

Example metadata components are described below. Additional information on metadata components is illustrated in FIG. 5C. FIG. 5C illustrates metadata components for a reference image (captured by reference image camera 535 with FOV 541) and a single source image (captured by source image camera 543), according to some embodiments. Specifically, FIG. 5C illustrates metadata components for point in space 537, which is at a depth plane 539. The point in space 537 may be represented using indices k, i, j.

Feature dot product—The dot product between (1) image features of the reference image $f^0$ and (2) image features of a source image ⟨ f⟨ $^n$ (i.e. $f^0 \cdot \rangle f \rangle^n$). A feature dot product may be calculated for each of the source image features. A feature dot product indicates a correlation between two of the feature vectors.

Ray directions $$r^0_{k,i,j}$$

and $$r^n_{k,i,j} \in \mathbb{R}^3$$

—The normalized direction to the 3D location of a point (k, i, j) in the plane sweep from the camera origins. More specifically, for a given point (k, i, j) and an image (e.g., a source image), the ray direction is a normalized vector that describes the direction of the point relative to the view of the image (e.g., the view of the source image). Said differently, the ray direction is a normalized vector that describes the direction of the point relative to the coordinate frame of the camera when it captured the image (the camera's position in space is the origin in this coordinate frame). A ray direction may be calculated for the reference image and for each source image. See FIG. 5C for additional information on ray directions.

Reference plane depth $$z^0_{k,i,j}$$

—The distance ("depth") from the position of the camera that captured the reference image ("reference camera") to a depth plane that includes point k, i, j. As indicated in FIG. 5C, the depth planes 539 are perpendicular to the image plane of the reference camera 535.

Source plane depth $$z^n_{k,i,j}$$

—The distance from the position of the camera that captured source image n ("source camera n") to a depth plane that includes point k, i, j. The depth planes are perpendicular to the image plane of the source image n. See FIG. 5C for additional information on source plane depth.

Relative ray angles $\theta^{0,n}$—The angle between $$r^0_{k,i,j}$$

and $$r^n_{k,i,j}.$$

A relative ray angle may be calculated for each source image (relative to the ray direction of the reference image). See FIG. 5C for additional information on relative ray angles.

Relative pose distance $p^{0,n}$—A measure of the distance between the pose of the reference camera and the pose of a source camera n. In some embodiments, the relative pose distance is given by:

$$p^{o,n} = \sqrt{\left\| t^{0,n} \right\| + \frac{2}{3} tr\left(\mathbb{I} - R^{0,n}\right)} \tag{1}$$

where $\mathbb{I}$ is the identity matrix, $t^{0,n}$ is the relative position of source camera n to the reference camera (e.g., $\|t^0 - t^n\|$), $R^{0,n}$ is the relative rotation transformation between the reference camera and source camera n, and tr() is the trace function (the sum of elements on the main diagonal of the input matrix). A relative pose distance may be calculated for each source image (relative to the reference image). See FIG. 5C for additional information on relative pose distances.

Depth validity masks $$m^n_{k,i,j}$$

—A binary mask that indicates if point (k, i, j) in the feature volume 510 projects in front of the source camera n or not.

Among other advantages, by appending metadata-derived features into the feature volume 510, the reduction model 515 may learn to correctly weigh the contribution of each source image at each pixel location. Consider for instance the pose distance $p^{0,n}$. For depths farther from the camera, the matching features from source images with a greater baseline may be more informative. More specifically, at farther depths, visual features may appear more similar in the same 2D spatial location in images of two viewpoints that are close together (small baseline). If the cameras are farther apart (larger baseline), then the same point in space would appear at more distinctly different positions in the images of the viewpoints. Thus, having access to information on the length of the camera baselines allows the network to learn how to "trust" the visual features of a source image that has a wider baseline compared to one with a smaller baseline. Similarly, ray information (e.g., ray directions or relative ray angles) may be useful for reasoning about occlusions. If features from the reference image disagree with those from a source image but there is a large angle between camera rays, then this may be explained by an occlusion rather than incorrect depth. Depth validity masks can help the depth estimation model 527 to know whether to trust features from source camera n at (k, i, j). By allowing the depth estimation model 527 access to this kind of information, it is given the ability to conduct such geometric reasoning when aggregating information from multiple source images.

In addition to explicitly providing one or more metadata components in the feature volume 510, the metadata may be implicitly encoded in the feature volume 510 according to a specific ordering. This is motivated by the inherent order dependence of the reduction model 515, which is exploited by choosing the ordering in which the metadata are stacked or ordered in the feature volume 510. While the metadata can be ordered according to many different metrics, ordering by relative pose distance may be advantageous since relative pose distance may be effective for improved (e.g., optimal) keyframe selection. For example, the metadata may be ordered according to ascending or descending relative pose distance. Ordering according to relative pose distance may allow the reduction model 515 to learn a prior on pose distance and feature relevance. More specifically, following on the idea that knowledge of pose distances allows for better matching of visual features and depth plane scoring, this knowledge can be implicitly encoded by ordering visual and metadata features according the pose distance on input to the reduction model 515. In some embodiments, metadata are ordered according to the time stamps of the associated image (e.g., ordered according to time closest to the time stamp of the reference image).

Experiments show that by including metadata in the depth estimation model 527 (via the cost volume 520), both explicitly via extra feature channels and implicitly via metadata ordering, the depth estimation model 527 obtains a significant boost to depth estimation accuracy, bringing with it improved 3D reconstruction quality (see e.g., Table 4).

The following two sections describe example network architecture of the depth estimation module 500 and losses and provide helpful practices for depth estimation, according to some embodiments.

4.3 Architecture Design of Depth Estimation Module

As previously stated, the depth estimation model 527 may have a 2D convolutional encoder-decoder architecture. When constructing such networks, there are design choices which may provide improvements to depth prediction accuracy. For example, it may be desirable for the depth estimation model 527 to avoid complex structures such as LSTMs (Long Short-Term Memory networks) or GPs (Gaussian Processes) and thus make the baseline model lightweight and interpretable.

Baseline feature volume fusion—While RNN-based temporal fusion methods may be used, they may significantly increase the complexity of the depth estimation module 500. Thus, in some embodiments, it may be desirable to make the baseline feature volume fusion simple since the inventors found that summing the dot-product matching costs between the reference image and each source image leads to results competitive with state-of-the-art depth estimation techniques, as shown in Table 1 with the heading "no metadata".

Image encoder and feature matching encoder—Prior depth estimation works have shown the impact of more powerful image encoders for the task of depth estimation, both in monocular and multi-view estimation. However, in some embodiments, the depth estimation model 527 includes a small but powerful EfficientNetv2 S encoder. While this does come with a cost of increased parameter count and slower execution, it yields a sizeable improvement to depth estimation accuracy, especially for precise metrics such as Sq Rel and $\delta<1.05$. See Table 4 for more results.

For producing matching feature maps, the first two blocks from ResNet18[1] may be used for efficiency. Furthermore, FPN[2] following ResNet18 was found to improve accuracy at the expense of a 50% slower overall run-time.

Fuse multi-scale image features into the cost volume encoder—In 2D CNN based deep stereo and multi-view stereo, image features may be combined with the output of the cost volume at a single scale. However, it may also be useful to concatenate deep image features at multiple scales, add skip connections between the image encoder and cost volume encoder at one or more resolutions. See Duzceker et al.[3] for additional information on this.

Number of source images—While some techniques show diminishing returns as additional source images are added, the models described herein are better able to incorporate this additional information and display increased performance (e.g., with up to 8 images). The inventors posit that incorporating additional metadata for each images allows the depth estimation model 527 to 'make a more informed decision' about the relative weightings of each image's features when inferring the final cost. In contrast, other techniques give each image equal weight during an update, thus potentially overwhelming useful information with lower-quality features.

4.4 Loss

The depth estimation model 527 may be trained by the depth estimation training system 330 using a combination of

[1] He, K., Zhang, X., Ren, S., Sun, J.: Deep residual learning for image recognition. In: CVPR (2016)

[2] Lin, T. Y., Doll'ar, P., Girshick, R., He, K., Hariharan, B., Belongie, S.: Feature pyramid networks for object detection. In: Proceedings of the IEEE conference on computer vision and pattern recognition. pp. 2117-2125 (2017)

geometric losses, inspired by MVS methods as well as monocular depth estimation techniques. The inventors found that careful choice of the loss function improved performance and that supervising intermediate predictions at lower output scales also improved results.

Depth regression loss—In some embodiments, the depth estimation training system 330 uses techniques similar Duzceker et al.[3] and densely supervises predictions using log-depth, but may use an absolute error on log depth for each scale s,

[3]Duzceker, A., Galliani, S., Vogel, C., Speciale, P., Dusmanu, M., Pollefeys, M.: Deepvideomvs: Multi-view stereo on video with recurrent spatio-temporal fusion. In: CVPR (2021)

$$\mathcal{L}_{depth=\frac{1}{HW}} = \sum_{s=1}^{4}\sum_{i,j}\frac{1}{s^2}\left|\uparrow_{gt}\log\hat{D}^{s}_{i,j} - \log D^{gt}_{i,j}\right|, \quad (2)$$

where each lower scale depth is upsampled using nearest neighbor upsampling to the highest scale predicted at with the $\uparrow_{gt}$ operator. This loss may be averaged per pixel, per scale, and per batch. Experiments found this loss to perform better than the scale-invariant formulation of Eigen et al.[4 5], while producing sharper depth boundaries, resulting in higher fused reconstruction quality.

Multi-scale gradient and normal losses—In some embodiments, the depth estimation training system 330 uses techniques similar to papers[6 7 8] and uses a multi-scale gradient loss on the highest resolution network output:

$$\mathcal{L}_{grad=\frac{1}{HW}} = \sum_{s=1}^{4}\sum_{i,j}\left|\nabla\downarrow_s\hat{D}_{i,j} - \nabla\downarrow_s D^{gt}_{i,j}\right|, \quad (3)$$

where $\nabla$ is first order spatial gradients and $\downarrow_s$ represents downsampling to scale s. Inspired by Yin et al.[9] the depth estimation training system 330 may also use a simplified normal loss, where N is the normal map computed using the depth and intrinsics, $$\mathcal{L}_{normals} = \frac{1}{2HW}\sum_{i,j}1 - \hat{N}_{i,j}N_{i,j} \quad (4)$$

Multi-view depth regression loss—In some embodiments, the depth estimation training system 330 uses ground-truth depth maps for each source view as additional supervision by projecting predicted depth $\hat{D}$ into each source view and averaging absolute error on log depth over all valid points,

[4]Eigen, D., Puhrsch, C., Fergus, R.: Depth map prediction from a single image using a multi-scale deep network. In: NeurIPS (2014).

[5]Bhat, S. F., Alhashim, I, Wonka, P.: AdaBins: Depth estimation using adaptive bins. In: CVPR (2021)

[6]Li, Z., Snavely, N.: MegaDepth: Learning single-view depth prediction from internet photos. In: CVPR (2018)

[7]Yin, W., Zhang, J., Wang, O., Niklaus, S., Mai, L., Chen, S., Shen, C.: Learning to recover 3D scene shape from a single image. In: CVPR (2021)

[8]Ranftl, R., Lasinger, K., Hafner, D., Schindler, K., Koltun, V.: Towards robust monocular depth estimation: Mixing datasets for zero-shot cross-dataset transfer. PAMI (2020)

[9]Yin, W., Liu, Y., Shen, C., Yan, Y.: Enforcing geometric constraints of virtual normal for depth prediction. In: ICCV (2019)

$$\mathcal{L}_{mv=\frac{1}{NHW}} = \sum_{n}\sum_{i,j}\left|\log\hat{D}^{0\to n}_{i,j} - \log D^{gt}_{n,i,j}\right|, \quad (5)$$

where $\hat{D}^{0\to n}$ is the depth predicted for the reference image of index 0, projected into source view n. This is similar in concept to the depth regression loss above, but for simplicity is applied only on the final output scale.

Total loss—Overall the total loss may be:

$$\mathcal{L} = \mathcal{L}_{depth} + \alpha_{grad}\mathcal{L}_{grad} + \alpha_{normals}\mathcal{L}_{normals} + \alpha_{mv}\mathcal{L}_{n,i,j}, \quad (6)$$

with $\alpha_{grad}=1.0=\alpha_{normals}=1.0$, and $\alpha_{mv}=0.2$, chosen experimentally using the validation set.

TABLE 1

Depth evaluation. For each metric, the best-performing method is "Ours" (bottom row), the second-best is "Ours (no metadata)" (row second from the bottom), and the third-best is "VideoMVS."

| | ScanNetv2 Dataset | | | | | 7Scenes Dataset | | | | |
|---|---|---|---|---|---|---|---|---|---|---|
| | Abs Diff↓ | Abs Rel↓ | Sq Rel↓ | δ < 1.05↑ | δ < 1.25↑ | Abs Diff↓ | Abs Rel↓ | Sq Rel↓ | δ < 1.05↑ | δ < 1.25↑ |
| DPSNet[10] | 0.1552 | 0.0795 | 0.0299 | 49.36 | 93.27 | 0.1966 | 0.1147 | 0.0550 | 38.81 | 87.07 |
| MVDepthNet[11] | 0.1648 | 0.0848 | 0.0343 | 46.71 | 92.77 | 0.2009 | 0.1161 | 0.0623 | 38.81 | 87.70 |
| DELTAS[12] | 0.1497 | 0.0786 | 0.0276 | 48.64 | 93.78 | 0.1915 | 0.1140 | 0.0490 | 36.36 | 88.13 |
| GPMVS[13] | 0.1494 | 0.0757 | 0.0292 | 51.04 | 93.96 | 0.1739 | 0.1003 | 0.0462 | 42.71 | 90.32 |
| VideoMVS, fusion[3]* | 0.1186 | 0.0583 | 0.0190 | 60.20 | 96.76 | 0.1448 | 0.0828 | 0.0335 | 47.96 | 93.79 |
| Ours (no metadata) | 0.0941 | 0.0467 | 0.0139 | 70.48 | 97.84 | 0.1105 | 0.0617 | 0.0175 | 57.30 | 97.02 |
| Ours | 0.0885 | 0.0434 | 0.0125 | 73.16 | 98.09 | 0.1045 | 0.0575 | 0.0153 | 59.78 | 97.38 |

*Note that VideoMVS's scores were boosted by using three inference frames instead of two. VideoMVS also uses a custom 90/10 split.

[10]Im, S., Jeon, H. G., Lin, S., Kweon, I. S.: DPSNet: End-to-end deep plane sweep stereo. ICLR (2019)

[11]Wang, K., Shen, S.: MVDepthNet: Real-time multiview depth estimation neural network. In: 3DV (2018)

[12]Sinha, A., Murez, Z., Bartolozzi, J., Badrinarayanan, V., Rabinovich, A.: Deltas: Depth estimation by learning triangulation and densification of sparse points. In: ECCV (2020)

[13]Hou, Y., Kannala, J., Solin, A.: Multi-view stereo by temporal nonparametric fusion. In: ICCV (2019)

5. Experiments

The inventors trained and evaluated a method on the 3D scene reconstruction dataset ScanNetv2, which comprises 1,201 training, 312 validation, and 100 testing scans of indoor scenes, all captured with a handheld RGBD sensor. The inventors also evaluated the ScanNetv2 models without fine-tuning on the 7-Scenes dataset using Duzceker et al.'s[3] test split.

5.1 Depth Estimation

In Table 1, the inventors evaluated the depth predictions from a depth estimation module 500 using the metrics established in Eigen et al.[14]. The inventors also introduced a tighter threshold tolerance $\delta<1.05$ to differentiate between high quality models.

The inventors used the standard test split for the ScanNetv2 dataset and the test split defined by Duzceker et al.[3] for the 7-Scenes dataset. They computed depth metrics for every keyframe as in Duzceker et al and average across all keyframes in the test sets. As indicated, our model, which used no 3D convolutions, outperformed all baselines on depth prediction metrics. In addition, the baseline model with no metadata encoding (i.e., using only the dot product between reference and source image features) also performs well in comparison to previous methods, showing that a carefully designed and trained 2D network is sufficient for high-quality depth estimation. Qualitative results for depth and normal are illustrated in FIGS. 6-7 respectively.

Figure 6:
FIG. 6 illustrates additional depth predictions by various models, according to some embodiments.

FIG. 6 illustrates depth predictions by various models using the ScanNet data. The top row of images includes reference images and the remaining rows are depth maps generated by various models based on those reference images. As illustrated, our model (row 4) produces significantly sharper and more accurate depths than the baselines of ESTDepth[15], DVMVS[3], and GT Depth.

Figure 7:
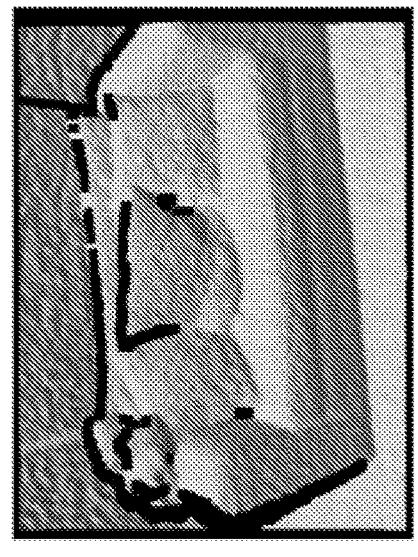
FIG. 7 illustrates normal generations by various models, according to some embodiments.
Figure 7:
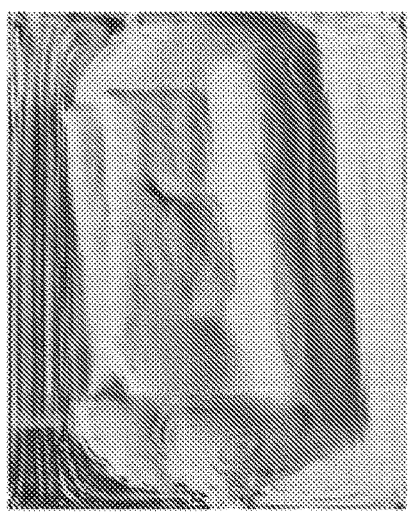
Figure 7:
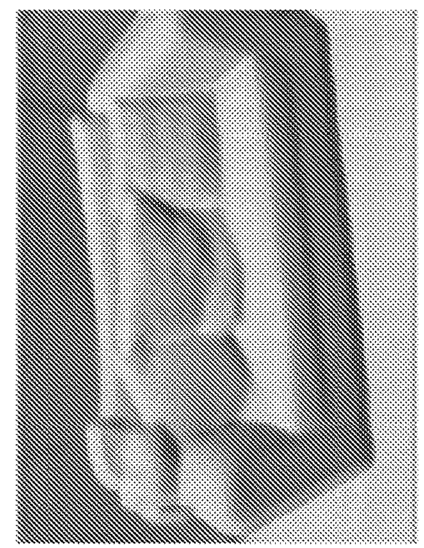
Figure 7:

FIG. 7 illustrates 2D normal map generations by various models using the ScanNet data. A 2D normal map includes a 3D normal vector at every spatial location of the image representing the orientation of a surface as seen from the image. As illustrated, our model produces significantly sharper normal than the methods of DVMVS[3], GT, and IDNSolyer[16].

[14] Eigen, D., Puhrsch, C., Fergus, R.: Depth map prediction from a single image using a multi-scale deep network. In: NeurIPS (2014)

[15] Long, X., Liu, L., Li, W., Theobalt, C., Wang, W.: Multi-view depth estimation using epipolar spatio-temporal networks. In: CVPR (2021)

[16] Zhao, W., Liu, S., Wei, Y., Guo, H., Liu, Y. J.: A confidence-based iterative solver of depths and surface normals for deep multi-view stereo. In: ICCV. pp. 6168-6177 (October 2021)

TABLE 2

Mesh Evaluation. The evaluation in Bozic et al.[17] was used. The Volumetric column designates whether a method is a volumetric 3D reconstruction method. Other MVS methods that produce only depth maps were reconstructed using standard TSDF fusion.

| Score↑ | Volumetric | Comp↓ | Acc↓ | Chamfer↓ | Prec↓ | Recall↑ | F– |
|---|---|---|---|---|---|---|---|
| RevisitingSI[18] | No | 14.29 | 16.19 | 15.24 | 0.346 | 0.293 | 0.314 |
| MVDepthNet[19] | No | 12.94 | 8.34 | 10.64 | 0.443 | 0.487 | 0.460 |
| GPMVS[20] | No | 12.90 | 8.02 | 10.46 | 0.453 | 0.510 | 0.477 |
| ESTDepth[21] | No | 12.71 | 7.54 | 10.12 | 0.456 | 0.542 | 0.491 |
| DPSNet[22] | No | 11.94 | 7.58 | 9.77 | 0.474 | 0.519 | 0.492 |
| DELTAS[23] | No | 11.95 | 7.46 | 9.71 | 0.478 | 0.533 | 0.501 |
| DeepVideoMVS[3] | No | 10.68 | 6.90 | 8.79 | 0.541 | 0.592 | 0.563 |
| COLMAP[24] | No | 10.22 | 11.88 | 11.05 | 0.509 | 0.474 | 0.489 |
| ATLAS[25] | Yes | 7.16 | 7.61 | 7.38 | 0.675 | 0.605 | 0.636 |
| NeuralRecon[26] | Yes | 5.09 | 9.13 | 7.11 | 0.630 | 0.612 | 0.619 |
| 3DVNet[27] | Yes | 7.72 | 6.73 | 7.22 | 0.655 | 0.596 | 0.621 |
| TransformerFusion[17] | Yes | 5.52 | 8.27 | 6.89 | 0.728 | 0.600 | 0.655 |
| VoRTX[28] | Yes | 4.31 | 7.23 | 5.77 | 0.767 | 0.651 | 0.703 |
| Ours | No | 5.53 | 6.09 | 5.81 | 0.686 | 0.658 | 0.671 |

[17] Bozic, A., Palafox, P., Thies, J., Dai, A., Nieβner, M.: TransformerFusion: Monocular RGB scene reconstruction using transformers. NeurIPS (2021)

[18] Hu, J., Ozay, M., Zhang, Y., Okatani, T.: Revisiting single image depth estimation: Toward higher resolution maps with accurate object boundaries. In: WACV (2018)

[19] Wang, K., Shen, S.: MVDepthNet: Real-time multiview depth estimation neural network. In: 3DV (2018)

[20] Hou, Y., Kannala, J., Solin, A.: Multi-view stereo by temporal nonparametric fusion. In: ICCV (2019)

[21] Long, X., Liu, L., Li, W., Theobalt, C., Wang, W.: Multi-view depth estimation using epipolar spatio-temporal networks. In: CVPR (2021)

[22] Im, S., Jeon, H. G., Lin, S., Kweon, I. S.: DPSNet: End-to-end deep plane sweep stereo. ICLR (2019)

[23] Sinha, A., Murez, Z., Bartolozzi, J., Badrinarayanan, V., Rabinovich, A.: Deltas: Depth estimation by learning triangulation and densification of sparse points. In: ECCV (2020)

[24] Schonberger, J. L., Zheng, E., Pollefeys, M., Frahm, J. M.: Pixelwise view selection for unstructured multi-view stereo. In: European Conference on Computer Vision (ECCV) (2016)

[25] Murez, Z., van As, T., Bartolozzi, J., Sinha, A., Badrinarayanan, V., Rabinovich, A.: Atlas: End-to-end 3D scene reconstruction from posed images. In: ECCV (2020)

[26] Sun, J., Xie, Y., Chen, L., Zhou, X., Bao, H.: NeuralRecon: Real-time coherent 3D reconstruction from monocular video. In: CVPR (2021)

[27] Rich, A., Stier, N., Sen, P., Höllerer, T.: 3dvnet: Multi-view depth prediction and volumetric refinement. In: International Conference on 3D Vision (3DV) (2021)

[28] Stier, N., Rich, A., Sen, P., Höllerer, T.: Vortx: Volumetric 3d reconstruction with transformers for voxelwise view selection and fusion. In: International Conference on 3D Vision (3DV) (2021)

5.2 3D Reconstruction Evaluation

The 3D reconstructions were evaluated using a ground truth mesh based prediction mask to cull away parts of the prediction such that methods are not unfairly penalized for predicting potentially correct geometry that is missing in the ground truth. Scores are shown in Table 2. The inventors' depth-based method outperforms state-of-the-art depth estimators for fusion by a wide margin. Although the inventors did not perform global refinement of the resulting volume after fusion, they were still able to outperform more expensive volumetric methods in some metrics, showing overall competitive performance with lower complexity.

5.3 3D Reconstruction Latency

For online and interactive 3D reconstruction applications, reducing the latency from sensor reading to 3D representation update may be important. Most recent reconstruction methods use 3D CNN architectures that require expensive and often specialized hardware for sparse matrix computation. This makes them prohibitive for applications on low power devices (e.g., smartphones, IoE devices) where both compute and power are limited or may simply not support the operations. Reconstruction methods often report amortized frame time, where the total compute time for select keyframes is averaged over all frames in a sequence. While this is a useful metric for full offline scene reconstruction performance, it is not indicative of online performance, especially when considering latency.

In Table 3 the inventors computed the per-frame integration time given a new RGB frame. Some methods may not be designed to run on every keyframe. Notably, NeuralRecon[29] updates a chunk in world space when 9 keyframes have been received. However, for fairness across methods, the inventors did not count the time spent waiting to satisfy a keyframe requirement and they assumed that the output of immediately available frames with potentially subpar pose distances was comparable to how the method was intended to perform. For methods that require a 3D CNN, Table 3 reports the time for one 2D keyframe integration and a complete pass of the 3D CNN network. Although our method is slower than methods such as NeuralRecon[29] on a per-keyframe basis, our method can quickly perform updates to the reconstructed volume using online TSDF fusion methods, resulting in low update latencies.

TABLE 3

Frame integration latencies for 3D reconstruction. Table 3 lists latency measurements as the time to incorporate a new image measurement to a 3D representation. Note that NR (NeuralRecon) reports time amortized over all keyframes. * NeuralRecon requires sparse 3D convolutions.

| | Volume Update Mode | Breakdown | Update Latency (ms) ↓ | F-Score↑ |
|---|---|---|---|---|
| ATLAS[25] | Volume 3D CNN | 2D CNN (29 ms) + 3D CNN (353 ms) | 382 ms | 0.636 |
| NeuralRecon[29]* | 3D Chunk Fusion + GRU | 2D CNN (12 ms) + GRU (78 ms) | 90 ms | 0.619 |
| 3DVNet[30] | Iterative 3D CNN | Refine Depths and Feature Cloud (23875 ms) | 23875 ms | 0.621 |
| TransformerFusion[17] | Transformer Fusion + 3D CNN | 2D CNN (131 ms) + Refinement (195 ms) | 326 ms | 0.655 |
| VORTX[28] | Transformer Fusion + 3D CNN | 2D CNN (23 ms) + Refinement (4527 ms) | 4550 ms | 0.703 |
| Ours | TSDF Fusion | 2D Depth CNN (70 ms) + TSDF fuse (2 ms) | 72 ms | 0.671 |

[29]Sun, J., Xie, Y., Chen, L., Zhou, X., Bao, H.: NeuralRecon: Real-time coherent 3D reconstruction from monocular video. In: CVPR (2021)
[30]Rich, A., Stier, N., Sen, P., H¨ollerer, T.: 3dvnet: Multi-view depth prediction and volumetric refinement. In: International Conference on 3D Vision (3DV) (2021)

5.4 Ablations

In order to show the relevance and influence of the novel contributions described herein, this section describes ablating different parts of the network and training routine. Results for depth estimation and mesh reconstruction metrics on ScanNet are shown for ablations in Table 4.

Baseline—First, Table 4 shows that using no reduction model and using 16 feature channels, (reduced using a dot product) greatly degrades performance (row 2). Interestingly, using 64 feature channels instead of 16 degrades accuracy while being significantly slower (row 3).

Image ordering—Table 4 also compares two models where the ordering of the keyframes is shuffled, instead of relying on the pose distance (rows 4-5). As shown, while both models suffer from random ordering, the full model (row 5, which has access to the pose distance as metadata) does not suffer as much.

Metadata—In rows 6-9 of Table 4, all the models make use of the reduction model (e.g., an MLP) cost volume reduction, but the input of that reduction model is varied. To start, row 6 includes a baseline model using only the feature dot products aggregated using a sum. In subsequent rows, the inventors added the features ("feats"), their depth and validity mask ("mask"), reduced using the reduction model. More metadata is added down the rows until the full model is reached (row 9). Accuracy increases with the amount of information provided to the model (Accuracy is represented by the metrics in all columns. When an arrow next to the metric's name points downwards ↓, then a lower number in that column indicates that the model is more accurate. If the arrow points up ↑, then a higher number in that column indicates that the model is more accurate).

Views—In addition, Table 4 shows that the method may incorporate information from many source images. As we increase from 2 to 8 source images (rows 10-12 and 1), the performance (accuracy) continues to improve. In contrast, DeepVideoMVS's performance remains relatively constant when using more than three source images[3]. In addition, in row 10 the cost volume is ablated entirely by zeroing its output (creating a monocular method), leading to greatly decreased performance (accuracy), showing that a strong metric depth estimate from the cost volume is used to resolve scale ambiguity.

TABLE 4

Ablation Evaluation. Ablation evaluation on depth and reconstruction metrics using DVMVS keyframes for the ScanNet dataset. Scores for full method are bolded (rows 1 and 9) and are significantly improved over the other methods (e.g., compare rows 1 and 2).

| | Depth evaluation | | | | | Mesh eval | |
|---|---|---|---|---|---|---|---|
| | Abs Diff↓ | Sq Rel↓ | RMSE↓ | δ < 1.05↑ | δ < 1.25↑ | Chamfer↓ | F-score↑ |
| 1. Ours w/all metadata, 8 ordered frames, dot prod CV 16c, ENv2S + R18 | 0.0885 | 0.0125 | 0.1468 | 73.16 | 98.09 | 5.81 | 67.1 |
| 2. Ours baseline w/dot product CV 16c | 0.0941 | 0.0139 | 0.1544 | 70.48 | 97.84 | 6.29 | 64.2 |
| 3. Ours baseline w/dot product CV 64c | 0.0944 | 0.0140 | 0.1548 | 70.49 | 97.84 | 6.08 | 65.4 |
| 4. Ours w/o metadata, shuffled frames | 0.0920 | 0.0135 | 0.1521 | 71.59 | 97.91 | 6.04 | 65.6 |
| 5. Ours w/metadata, shuffled frames | 0.0906 | 0.0129 | 0.1490 | 72.09 | 98.03 | 5.92 | 66.3 |
| 6. Ours baseline w/dot product CV 16c | 0.0941 | 0.0139 | 0.1544 | 70.48 | 97.84 | 6.29 | 64.2 |
| 7. Ours dot + feats + mask + depth | 0.0904 | 0.0132 | 0.1509 | 72.63 | 98.03 | 5.92 | 66.5 |
| 8. Ours dot + feats + mask + depth + ray + angle | 0.0896 | 0.0127 | 0.1481 | 72.76 | 98.09 | 5.88 | 66.6 |
| 9. Ours dot + feats + mask + depth + ray + angle + pose distance | 0.0885 | 0.0125 | 0.1468 | 73.16 | 98.09 | 5.81 | 67.1 |
| 10. Ours w/1 frame - w/o CV | 0.1742 | 0.0374 | 0.2330 | 40.96 | 90.03 | 9.26 | 47.0 |
| 11. Ours w/2 frames | 0.1230 | 0.0198 | 0.1803 | 57.15 | 96.21 | 7.51 | 56.7 |
| 12. Ours w/4 frames | 0.1036 | 0.0151 | 0.1611 | 65.62 | 97.60 | 6.57 | 62.3 |
| 13. Ours w/metadata but w/MnasNet at 320 × 256 (matching [12]) | 0.0947 | 0.0146 | 0.1587 | 71.24 | 97.68 | 5.92 | 66.3 |

In some embodiments, the model generalizes on unseen environments (including outdoors) captured on a smartphone. For example, FIG. 8 includes samples of 3D reconstructions of environments using an example embodiment of the depth estimation model 527. These environments are not in the corpus of data that were used to train and evaluate the embodiment of the depth estimation model 527. The FIG. shows that the model 527 can generalize well beyond the data that was used to create it.

6. Example Methods

Figure 9:
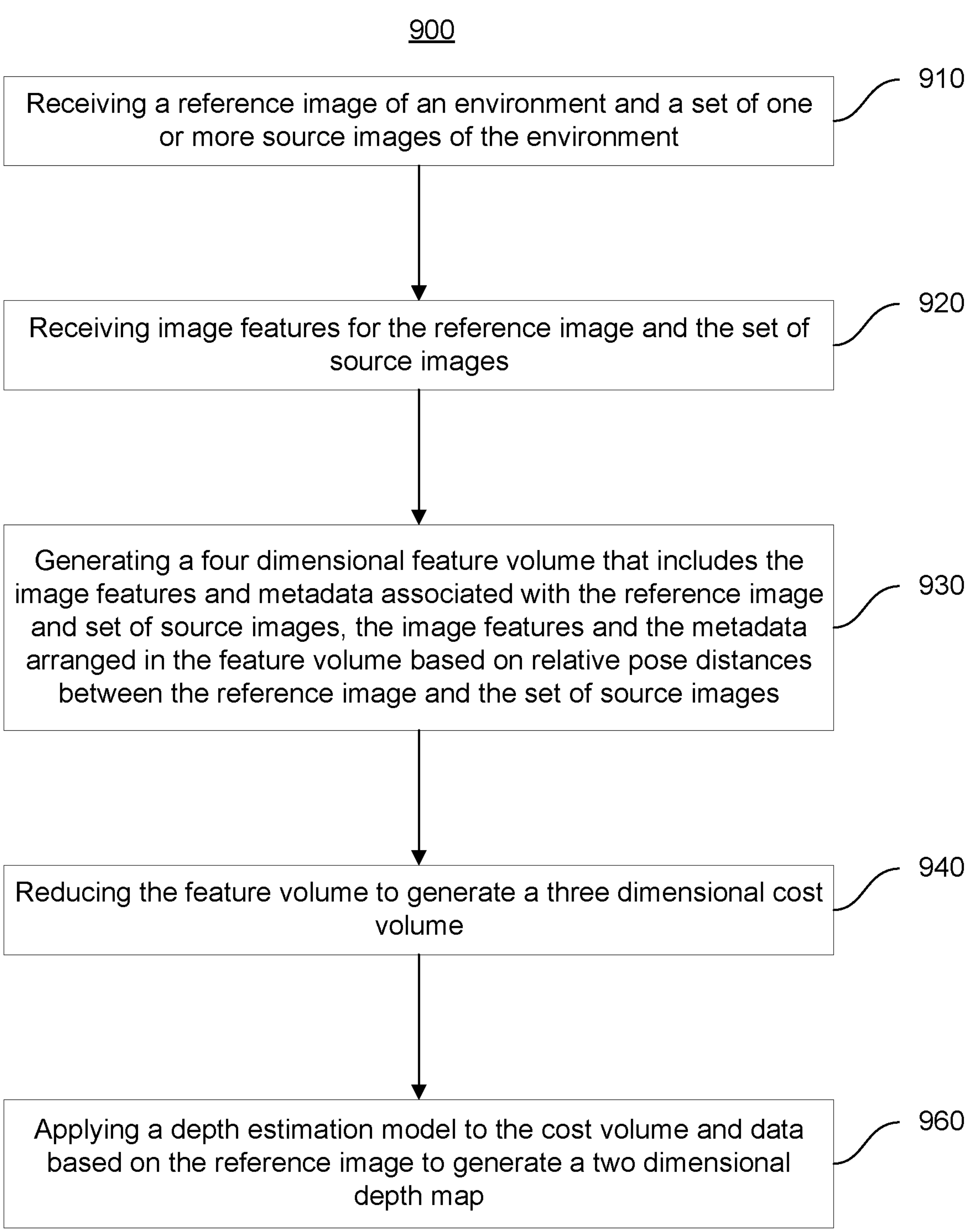
FIG. 9 is a flowchart describing an example method of generating a depth map for a reference image of an environment, according to some embodiments.

FIG. 9 is a flowchart describing an example method 900 of generating a depth map for a reference image of an environment, according to some embodiments. The steps of FIG. 9 are illustrated from the perspective of a depth estimation module (e.g., 311) performing the method 900. However, some or all of the steps may be performed by other entities or components. In addition, some embodiments may perform the steps in parallel, perform the steps in different orders, or perform different steps.

At step 910, the depth estimation module receives a reference image of an environment and a set of one or more source images of the environment. For example, a client device (e.g., 310) uses a camera assembly (e.g., 312) to capture a time series of (e.g., monocular or stereo) images of an environment. The reference image may be one of the images in the time series and the source images may be images that were captured before or after the reference image. In one embodiment, images with a time stamp within a threshold time of the time stamp of the reference image are selected to be the source images. In another embodiment, a threshold number of images with the closest time stamps to the reference time stamp are selected to be the source images. Each image (reference or source) may be captured by the same camera assembly (e.g., 312) or a different camera assembly.

At step 920, the depth estimation module receives image features for the reference image and the set of source images (e.g., via the matching feature encoder 505). In some embodiments, the depth estimation module may generate or computed these image features (e.g., using the matching feature encoder 505).

At step 930, the depth estimation module generates a 4D feature volume (e.g., 510) that includes the image features and metadata (e.g., 517) associated with the reference image and set of source images. The metadata may include data indicative of geometric information, such as data about the 3D relationship between the reference image and one or more of the source images. Example metadata includes a ray direction of the reference image $$r^0_{k,i,j};$$

a ray direction of one of the source images $$r^n_{k,i,j};$$

a reference plane depth $$z^0_{k,i,j};$$

a source plane depth $$z^n_{k,i,j};$$

a relative ray angle $\theta^{0,n}$; a relative pose distance $p^{0,n}$; and a depth validity mask $$m^n_{k,i,j}$$

(see Section 4 for more information on these metadata components).

The image features and the metadata may be arranged in the 4D feature volume according to one or more metrics (e.g., a metadata component). For example, the image features and the metadata may be arranged based on the relative pose distances between the reference image and the set of source images. Relative pose distance $p^{0,n}$ is a metric that describes the distance between the pose of the reference camera (the pose of a camera assembly when it captured the reference image) and the pose of a source camera n (the pose of a camera assembly when it captured source image n). In some embodiments, the relative pose distance for the reference image and one of the source images is given by:

$$p^{o,n} = \sqrt{\|t^{0,n}\| + \frac{2}{3} tr(\mathbb{I} - R^{0,n})},$$

where $\mathbb{I}$ is the identity matrix, $t^{0,n}$ is the relative position of source camera n to the reference camera, $R^{0,n}$ is the relative rotation transformation between the reference camera and source camera n, and tr( ) is the trace function. In some embodiments, the image features and metadata are arranged in the 4D feature volume according to ascending or descending order of relative pose distance.

The 4D feature volume may be a 4D tensor of dimension C×D×H×W, where C, D, H, and W are constants greater than zero. For each spatial location (k, i, j) of the feature volume, the 4D feature volume may include a C dimensional vector that includes: (1) image features of the reference image $$f^{0}_{k,i,j},$$

(2) image features of one or more of the images (e.g., $$\langle f \rangle^{n}_{k,i,j} \text{ for } n \in [1, N],$$

where ⟨ ⟩ indicates that the image features of the source images are perspective-warped into a reference frame of the reference image), (3) the metadata, or (4) a combination thereof.

At step 940, the depth estimation module reduces the 4D feature volume to generate a 3D cost volume (e.g., 520), for example, via the reduction model 515. Reducing the 4D feature volume may include reducing volumetric cells of the feature volume in parallel into a feature map.

At step 960, the depth estimation module applies a depth estimation model (e.g., depth estimation model 527) to the 3D cost volume and data based on the reference image to generate a two dimensional (2D) depth map for the reference image. The depth estimation model may include a 2D convolutional neural network with an encoder-decoder. In some embodiments, the image features of the reference image are generated by a first feature extractor model (e.g., 505) and the data based on the reference image includes second image features of the reference image generated by a second feature extractor model (e.g., 525) different from the first feature extractor model.

The method 900 may further include the depth estimation module or another module (e.g., the reconstruction module 313) generating a 3D representation of the environment based on the 2D depth map of the reference image. The 3D representation may be generated without performing a 3D convolution. In some embodiments, generating the 3D representation includes fusing the 2D depth map of the reference image with another 2D depth map (e.g., another 2D map generated by the depth estimation module 311 based on another reference image).

Determining accurate depth maps or 3D representations of environments may be advantageous for gaming applications, such as location-based games or augmented reality (AR) or virtual reality (VR) games. For example, an accurate depth map or 3D representation of an environments may result in AR objects appearing more realistic when displayed to a user.

Figure 10:
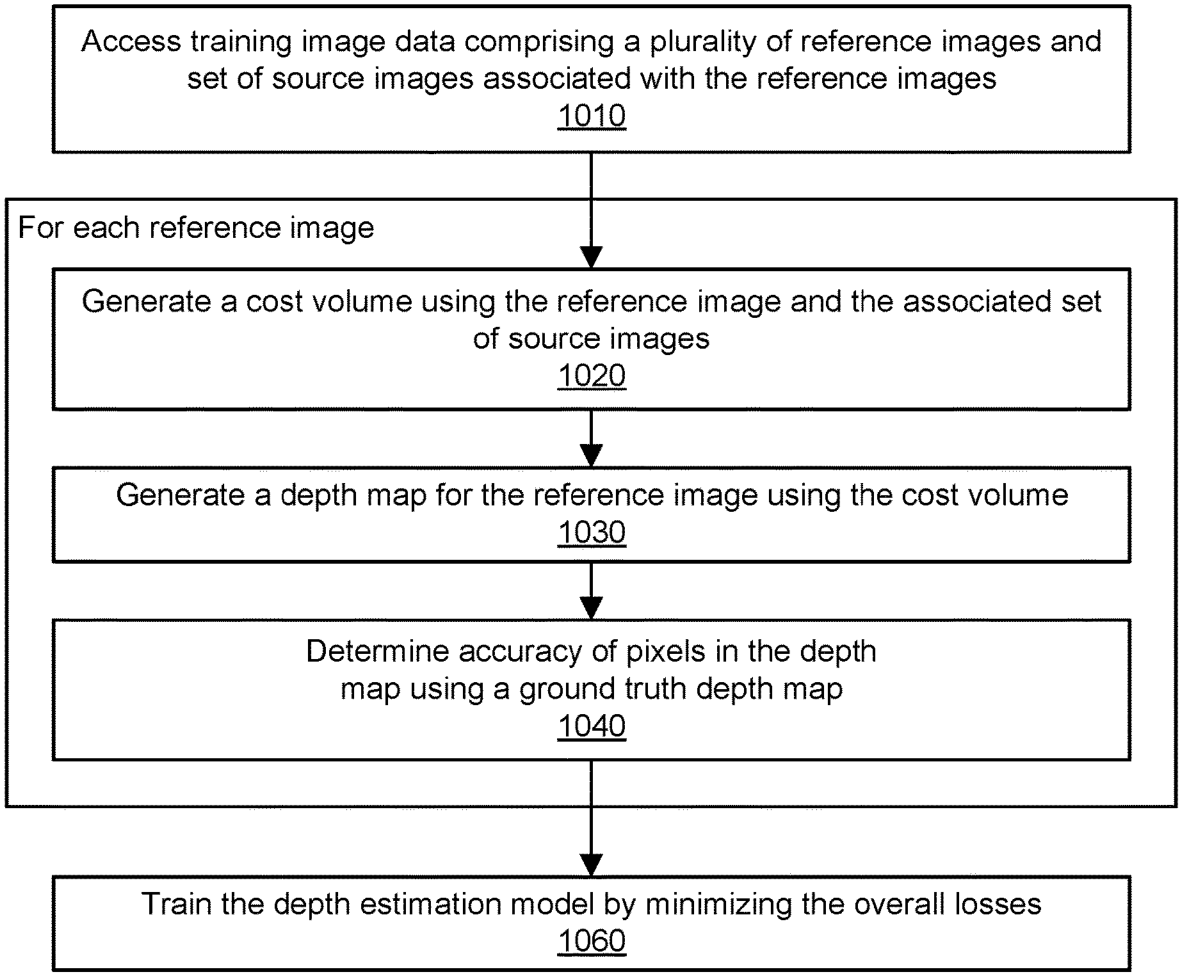
FIG. 10 is a flowchart describing an example method of training a depth map module, according to some embodiments.

FIG. 10 is a flowchart describing an example method 1000 of training a depth map module (e.g., 311), according to some embodiments. The steps of FIG. 10 are illustrated from the perspective of a depth estimation training system (e.g., 330) performing the method 1000. However, some or all of the steps may be performed by other entities or components. In addition, some embodiments may perform the steps in parallel, perform the steps in different orders, or perform different steps.

At step 1010, the depth estimation training system accesses training image data that includes a plurality of reference images and sets of source images associated with the reference images. For each reference image and a set of source images associated with that reference image in the accessed training image data, steps 1020-1050 may be performed.

At step 1020, the depth estimation training system generates a cost volume (e.g., 520) using the reference image and the associated set of source images. The cost volume may be generated according to steps from method 900 (e.g., steps similar to 920-940).

At step 1030, the depth estimation training system generates a depth map for the reference image using the cost volume. For example, the depth estimation training system (1) applies the cost volume to a depth estimation module (e.g., a step similar 950) and (2) applies the depth estimation module to the reference image (e.g., a step similar to 960). At step 1040, the depth estimation training system determines an accuracy of pixels in the depth map using a ground truth depth map for the reference image. For example, the depth estimation training system calculates a loss for the depth map of the reference image. At step 1060, the depth estimation training system trains the depth estimation model by minimizing the overall losses.

7 Example Computing System

Figure 11:
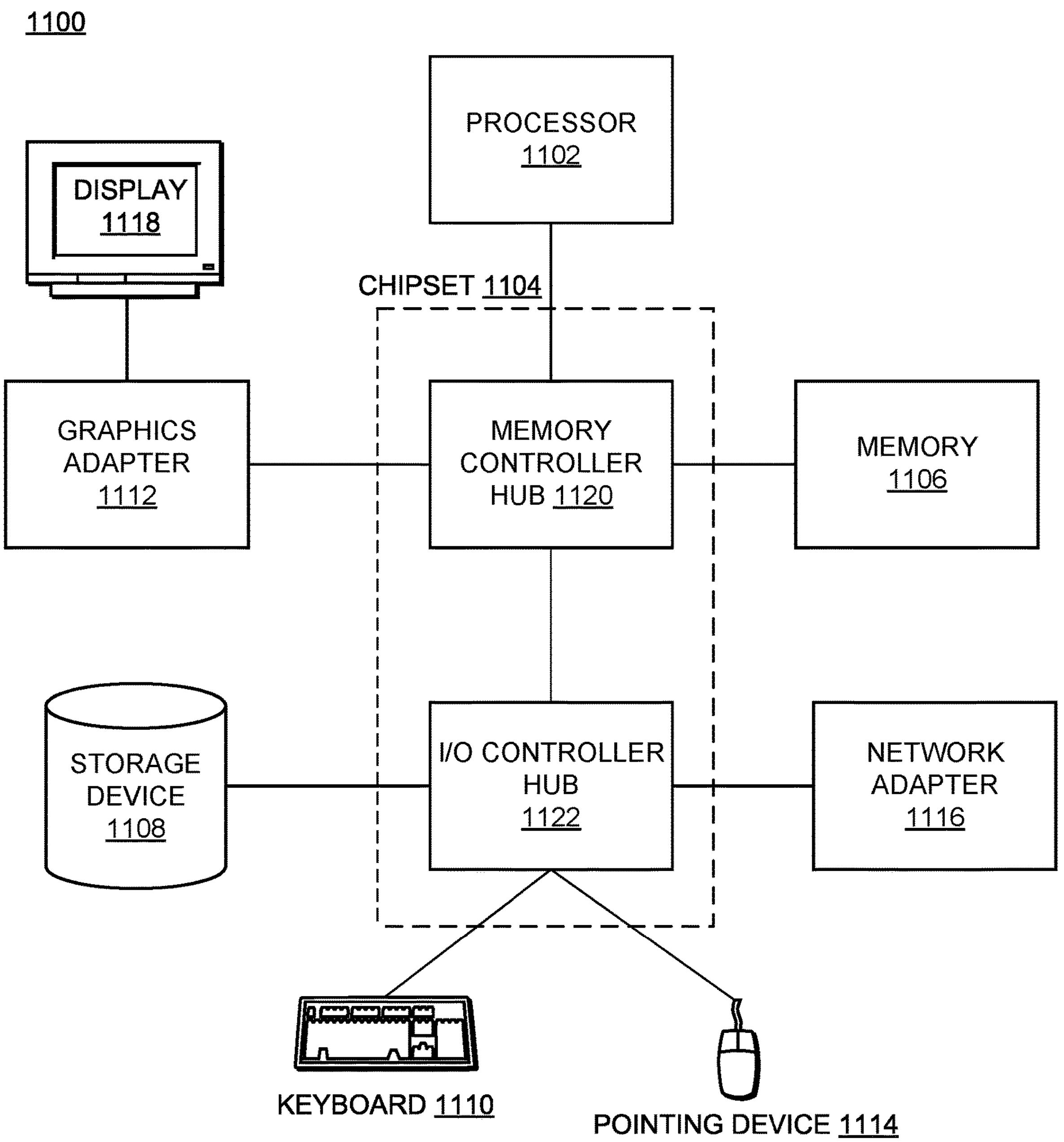
FIG. 11 illustrates an example computer system suitable for use in the networked computing environment of FIG. 1, according to one embodiment.

FIG. 11 is a block diagram of an example computer 1100 suitable for use as a client device 310 or game server 320. The example computer 1100 includes at least one processor 1102 coupled to a chipset 1104. References to a processor (or any other component of the computer 1100) should be understood to refer to any one such component or combination of such components working individually or cooperatively to provide the described functionality. The chipset 1104 includes a memory controller hub 1120 and an input/output (I/O) controller hub 1122. A memory 1106 and a graphics adapter 1112 are coupled to the memory controller hub 1120, and a display 1118 is coupled to the graphics adapter 1112. A storage device 1108, keyboard 1110, pointing device 1114, and network adapter 1116 are coupled to the I/O controller hub 1122. Other embodiments of the computer 1100 have different architectures.

In the embodiment shown in FIG. 11, the storage device 1108 is a non-transitory computer-readable storage medium such as a hard drive, compact disk read-only memory (CD-ROM), DVD, or a solid-state memory device. The memory 1106 holds instructions and data used by the processor 1102. The pointing device 1114 is a mouse, track ball, touch-screen, or other type of pointing device, and may be used in combination with the keyboard 1110 (which may be an on-screen keyboard) to input data into the computer system 1100. The graphics adapter 1112 displays images and other information on the display 1118. The network adapter 1116 couples the computer system 1100 to one or more computer networks, such as network 370.

The types of computers used by the entities of FIGS. 3 and 5 can vary depending upon the embodiment and the processing power required by the entity. For example, the game server 320 might include multiple blade servers working together to provide the functionality described. Furthermore, the computers can lack some of the components described above, such as keyboards 1110, graphics adapters 1112, and displays 1118.

8. Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by the following claims.

What is claimed is:

1. A method comprising:

receiving a reference image of an environment and a set of one or more source images of the environment;

receiving image features of the reference image and the set of source images, the image features representing visual information of the reference image and the set of source images;

generating a four dimensional (4D) feature volume that includes the image features and metadata associated with the reference image and set of source images, the image features and the metadata arranged in the 4D feature volume based on relative pose distances between the reference image and the set of source images;

reducing the 4D feature volume to generate a three dimensional (3D) cost volume; and applying a depth estimation model to the 3D cost volume and data based on the reference image to generate a two dimensional (2D) depth map for the reference image, wherein the 4D feature volume is a 4D tensor of dimension C×D×H×W, where C, D, H, and W are constants greater than zero, wherein for each spatial location (k, i, j), the 4D feature volume includes a C dimensional vector that includes (1) image features of the reference image $$f^0_{k,i,j},$$

(2) image features of the set of source images $$\langle f \rangle^n_{k,i,j}$$

for n∈[1, N], ⟨ ⟩ where indicates that the image features of the set of source images are perspective-warped into a reference frame of the reference image, and (3) the metadata.

2. The method of claim 1, wherein the image features and metadata are arranged in the 4D feature volume according to ascending or descending order of relative pose distance.

3. The method of claim 1, wherein the metadata in the 4D feature volume includes at least one of:

a ray direction of the reference image $$r^0_{k,i,j};$$

a ray direction of one of the source images $$r^n_{k,i,j};$$

a reference plane depth $$z^0_{k,i,j};$$

a source plane depth $$z^n_{k,i,j};$$

a relative ray angle $\theta^{0,n}$;

a relative pose distance $p^{0,n}$; or a depth validity mask $$m^n_{k,i,j}.$$

4. The method of claim 1, wherein the depth estimation model includes a 2D convolutional neural network including an encoder-decoder architecture augmented with the cost volume.

5. The method of claim 1, wherein reducing the 4D feature volume includes reducing volumetric cells of the 4D feature volume in parallel into a feature map.

6. The method of claim 1, further comprising generating a 3D representation of the environment based on the 2D depth map of the reference image.

7. The method of claim 6, wherein at least one of:

the 3D representation is generated without performing a 3D convolution or generating the 3D representation includes fusing the 2D depth map of the reference image with another 2D depth map.

8. The method of claim 1, wherein the image features of the reference image are generated by a first feature extractor model and the data based on the reference image includes second image features of the reference image generated by a second feature extractor model different from the first feature extractor model.

9. A method comprising:

receiving a reference image of an environment and a set of one or more source images of the environment;

receiving image features of the reference image and the set of source images, the image features representing visual information of the reference image and the set of source images;

generating a four dimensional (4D) feature volume that includes the image features and metadata associated with the reference image and set of source images, the image features and the metadata arranged in the 4D feature volume based on relative pose distances between the reference image and the set of source images;

reducing the 4D feature volume to generate a three dimensional (3D) cost volume; and applying a depth estimation model to the 3D cost volume and data based on the reference image to generate a two dimensional (2D) depth map for the reference image, wherein a relative pose distance for the reference image and one of the source images of the set of source images $p^{0,n}$ is given by $$p^{o,n} = \sqrt{\|t^{0,n}\| + \frac{2}{3}tr(\mathbb{I} - R^{0,n})},$$

where $\mathbb{I}$ is an identity matrix, $t^{0,n}$ is a relative position of source camera n to reference camera, $R^{0,n}$ is a relative rotation transformation between reference camera and source camera n, and tr () is a trace function.

10. A non-transitory computer-readable medium storing instructions that, when executed by a computing system, cause the computing system to perform operations comprising:

receiving a reference image of an environment and a set of one or more source images of the environment;

receiving image features of the reference image and the set of source images, the image geatures representing visual information of the reference image and the set of source images;

generating a four dimensional (4D) feature volume that includes the image features and metadata associated with the reference image and the set of source images, the image features and the metadata arranged in the 4D feature volume based on relative pose distances between the reference image and the set of source images;

reducing the 4D feature volume to generate a three dimensional (3D) cost volume; and applying a depth estimation model to the 3D cost volume and data based on the reference image to generate a two dimensional (2D) depth map for the reference image, wherein the 4D feature volume is a 4D tensor of dimension C×D×H×W, where C, D, H, and W are constants greater than zero, wherein for each spatial location (k, i, j), the 4D feature volume includes a C dimensional vector that includes (1) image features of the reference image $$f^0_{k,i,j},$$

(2) image features of the set of source images $$\langle f \rangle^n_{k,i,j}$$

for $n \in [1, N]$, $\langle\ \rangle$ indicates that the image features of the set of source images are perspective-warped into a reference frame of the reference image, and (3) the metadata.

11. The non-transitory computer-readable medium of claim 10, wherein the image features and metadata are arranged in the 4D feature volume according to ascending or descending order of relative pose distance.

12. The non-transitory computer-readable medium of claim 10, wherein the metadata in the 4D feature volume includes at least one of:

a ray direction of the reference image $$r^0_{k,i,j};$$

a ray direction of one of the source images $$r^n_{k,i,j};$$

a reference plane depth $$z^0_{k,i,j};$$

a source plane depth $$z^{n}_{k,i,j};$$

a relative ray angle $\theta^{0,n}$;

a relative pose distance $p^{0,n}$; or a depth validity mask $$m^{n}_{k,i,j}.$$

13. The non-transitory computer-readable medium of claim 10, wherein the depth estimation model includes a 2D convolutional neural network including an encoder-decoder architecture augmented with the cost volume.

14. The non-transitory computer-readable medium of claim 10, wherein reducing the 4D feature volume includes reducing volumetric cells of the 4D feature volume in parallel into a feature map.

15. The non-transitory computer-readable medium of claim 10, further comprising generating a 3D representation of the environment based on the 2D depth map of the reference image.

16. The non-transitory computer-readable medium of claim 15, wherein the 3D representation is generated without performing a 3D convolution.

17. The non-transitory computer-readable medium of claim 15, wherein generating the 3D representation includes fusing the 2D depth map of the reference image with another 2D depth map.

18. A non-transitory computer-readable medium storing instructions that, when executed by a computing system, cause the computing system to perform operations comprising:

receiving a reference image of an environment and a set of one or more source images of the environment;

receiving image features of the reference image and the set of source images, the image features representing visual information of the reference image and the set of source images;

generating a four dimensional (4D) feature volume that includes the image features and metadata associated with the reference image and the set of source images, the image features and the metadata arranged in the 4D feature volume based on relative pose distances between the reference image and the set of source images;

reducing the 4D feature volume to generate a three dimensional (3D) cost volume; and applying a depth estimation model to the 3D cost volume and data based on the reference image to generate a two dimensional (2D) depth map for the reference image, wherein a relative pose distance for the reference image and one of the source images of the set of source images $p^{0,n}$ is given by:

$$p^{o,n} = \sqrt{\left\|t^{0,n}\right\| + \frac{2}{3}tr(\mathbb{I} - R^{0,n})},$$

where $\mathbb{I}$ is an identity matrix, $t^{0,n}$ is a relative position of source camera n to reference camera, $R^{0,n}$ is a relative rotation transformation between reference camera and source camera n, and tr () is a trace function.

* * * * *